(12) United States Patent
Schreck et al.

(10) Patent No.: US 7,362,534 B1
(45) Date of Patent: Apr. 22, 2008

(54) SYSTEM FOR DETECTING A CHANGE IN HEAD-TO-DISK CONTACT STATUS IN A DISK DRIVE

(75) Inventors: Erhard Schreck, San Jose, CA (US); Francis P. Crimi, Los Altos, CA (US); Jingbo Yu, San Jose, CA (US); Michael Mallary, Sterling, MA (US); Scott Hughes, Cupertino, CA (US); Duc Bahn, San Jose, CA (US); Mark Heimbaugh, Pleasanton, CA (US); Kazuhiro Saito, San Jose, CA (US); Andrew LeFebvre, Campbell, CA (US); Joerg Ferber, San Jose, CA (US); Xiaoping Hu, Milpitas, CA (US); Douglas J. Krajnovich, Santa Clara, CA (US); Chris Hawks, Saratoga, CA (US); Donald J Brunnett, Pleasanton, CA (US); Bruce C Schardt, Tracy, CA (US)

(73) Assignee: Maxtor Corporation, Longmont, CO (US)

( * ) Notice: Subject to any disclaimer, the term of this patent is extended or adjusted under 35 U.S.C. 154(b) by 92 days.

(21) Appl. No.: 11/101,112

(22) Filed: Apr. 7, 2005

Related U.S. Application Data

(60) Provisional application No. 60/560,832, filed on Apr. 8, 2004.

(51) Int. Cl.
   *G11B 21/02* (2006.01)
   *G11B 5/596* (2006.01)
   *G11B 5/58* (2006.01)

(52) U.S. Cl. ..................... 360/75; 360/78.04

(58) Field of Classification Search ............. None
See application file for complete search history.

(56) References Cited

U.S. PATENT DOCUMENTS

| 4,777,544 | A | | 10/1988 | Brown et al. |
| 5,377,058 | A | | 12/1994 | Good et al. |
| 5,421,943 | A | | 6/1995 | Tam et al. |
| 5,539,592 | A | * | 7/1996 | Banks et al. .............. 360/75 |

(Continued)

OTHER PUBLICATIONS

U.S. Appl. No. 10/211,671, filed Aug. 2, 2002, McKenzie et al.

*Primary Examiner*—William Korzuch
*Assistant Examiner*—Jason Olson
(74) *Attorney, Agent, or Firm*—Todd R. Fronek; Westman, Champlin & Kelly

(57) ABSTRACT

A disk drive includes a rotatable storage disk, an actuator motor, a slider that magnetically interacts with the storage disk, and a drive circuitry. A portion of the slider moves between a first position wherein the slider does not contact the storage disk and a second position wherein the slider contacts the storage disk. The drive circuitry can detect when the position of the slider changes between these positions. In one embodiment, the drive circuitry monitors off-track movement of the slider to detect when the slider has moved between these positions. The drive circuitry can also current that is directed to the actuator motor that is used to compensate for off-track movement to detect when the slider moves between these positions. In yet another embodiment, the drive circuitry monitors a rotational velocity of the storage disk to detect approximately when the slider moves between these positions.

23 Claims, 14 Drawing Sheets

U.S. PATENT DOCUMENTS

| | | | |
|---|---|---|---|
| 5,677,808 A | 10/1997 | Cha et al. | |
| 5,862,015 A | 1/1999 | Evans et al. | |
| 5,880,626 A | 3/1999 | Dean | |
| 5,880,899 A | 3/1999 | Blachek et al. | |
| 5,959,801 A | 9/1999 | Gillis et al. | |
| 5,965,840 A | 10/1999 | Nagarajan et al. | |
| 5,991,113 A | 11/1999 | Meyer et al. | |
| 5,999,372 A | 12/1999 | Peterson et al. | |
| 6,011,239 A | 1/2000 | Singh et al. | |
| 6,195,219 B1 | 2/2001 | Smith | |
| 6,288,856 B1 | 9/2001 | Ottesen et al. | |
| 6,359,746 B1 | 3/2002 | Kakekado et al. | |
| 6,452,740 B1 | 9/2002 | Ghoshal | |
| 6,538,836 B1 | 3/2003 | Dunfield et al. | |
| 6,636,374 B1 * | 10/2003 | Goh et al. | 360/75 |
| 6,735,036 B1 | 5/2004 | Olim | |
| 6,757,124 B2 * | 6/2004 | Kelemen | 360/75 |
| 6,768,610 B1 | 7/2004 | Morris et al. | |
| 7,095,587 B2 * | 8/2006 | Kurita et al. | 360/128 |
| 7,158,325 B1 | 1/2007 | Hu et al. | |
| 2001/0030822 A1 | 10/2001 | Boutaghou et al. | |
| 2002/0067565 A1 | 6/2002 | Kelemen | |
| 2002/0097528 A1 | 7/2002 | Williams et al. | |
| 2003/0011915 A1 | 1/2003 | Riddering et al. | |
| 2003/0174430 A1 | 9/2003 | Takahashi et al. | |
| 2003/0193727 A1 * | 10/2003 | Fioravanti et al. | 360/31 |
| 2005/0052773 A1 | 3/2005 | Suk | |
| 2005/0057841 A1 | 3/2005 | Stover et al. | |
| 2005/0078400 A1 | 4/2005 | Hassan | |

\* cited by examiner

SYSTEM FOR DETECTING A CHANGE IN HEAD-TO-DISK CONTACT STATUS IN A DISK DRIVE

RELATED APPLICATION

This application claims the benefit on U.S. Provisional Application Ser. No. 60/560,832 filed on Apr. 8, 2004. The contents of U.S. Provisional Application Ser. No. 60/560,832 are incorporated herein by reference.

BACKGROUND

Disk drives are widely used in computers, consumer electronics and data processing systems for storing information in digital form. The disk drive typically includes one or more storage disks and one or more head suspension assemblies. Each head suspension assembly includes a slider having an air bearing surface, and a read/write head that transfers information to and from the storage disk. The rotation of the storage disk causes the slider to ride on an air bearing so that the read/write head is at a distance from the storage disk that is referred to as a "head-to-disk spacing".

Because today's disk drives utilize storage disks having increasingly high densities of data tracks, decreasing the head-to-disk spacing has become of great importance. However, this desire for a very small head-to-disk spacing must be balanced with tribological concerns in order to avoid damage to the read/write head and/or the storage disk, as well as loss of data.

Further, a large variation in the head-to-disk spacing from slider to slider can cause significant issues in the manufacturing and reliability of the disk drives. Additionally, maintaining a relatively small and consistent head-to-disk spacing is further complicated by other factors. In particular, the read/write head includes a write head having a write element. During a write operation, the electrical resistance of the write element generates heat in and around the read/write head. The extent and rate of heating depends upon the level of current directed to the write element. This temperature increase causes thermal expansion of portions of the slider toward the storage disk, known as "write pole tip protrusion" or WPTP. If the write pole tip protrusion is too extensive, the slider can unintentionally contact the storage disk, causing off-track writing, damage to the slider, damage to the storage disk and/or a permanent loss of data.

Unfortunately, the ability to accurately determine the actual head-to-disk spacing in situ has been elusive. In conventional disk drives, only relative changes in head-to-disk spacing have been at least theoretically attainable.

SUMMARY

The present invention is directed to a disk drive including a rotatable storage disk, a slider that magnetically interacts with the storage disk, and a drive circuitry. A portion of the slider moves between a first position wherein the slider does not contact the storage disk and a second position wherein the slider contacts the storage disk. In one embodiment, the drive circuitry detects approximately when the position of the slider changes between the first position and the second position. Further, the slider includes a slider mover. The drive circuitry can direct a varying level of current to the slider mover until the drive circuitry detects that the slider has moved between the first position and the second position.

Further, the storage disk includes one or more tracks that each has a centerline. In one embodiment, the drive circuitry monitors movement of the slider relative to the centerline to detect approximately when the slider has moved between the first position and the second position. For example, the drive circuitry can monitor an amplitude of a position error signal that is received from the slider to detect approximately when the slider moves between the first position and the second position.

In another embodiment, the drive circuitry can direct a plurality of pulses of current to the slider mover at a pulse frequency that is a multiple of a rotation frequency of the storage disk. Each pulse can include an on cycle wherein current is directed to the slider mover, and an off cycle wherein current is not directed to the slider mover. The duration of the on cycle can be approximately equal to the duration of the off cycle. The drive circuitry can compare the position error signal during the on cycle to the position error signal during the off cycle to determine an approximate threshold level of current to the slider mover that causes the slider to contact the storage disk.

In an alternative embodiment, the drive circuitry receives and monitors a readback voltage amplitude signal from the slider in order to detect approximately when the slider moves between the first position and the second position. In yet another embodiment, the drive circuitry monitors a rotational velocity of the storage disk to detect approximately when the slider moves between the first position and the second position. For example, the drive circuitry can monitor a variable frequency oscillator signal to determine changes in the rotational speed of the storage disk, and thereby determine head-to-disk contact.

The present invention also includes a method for detecting approximately when the position of a portion of a slider changes between the first position and the second position.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
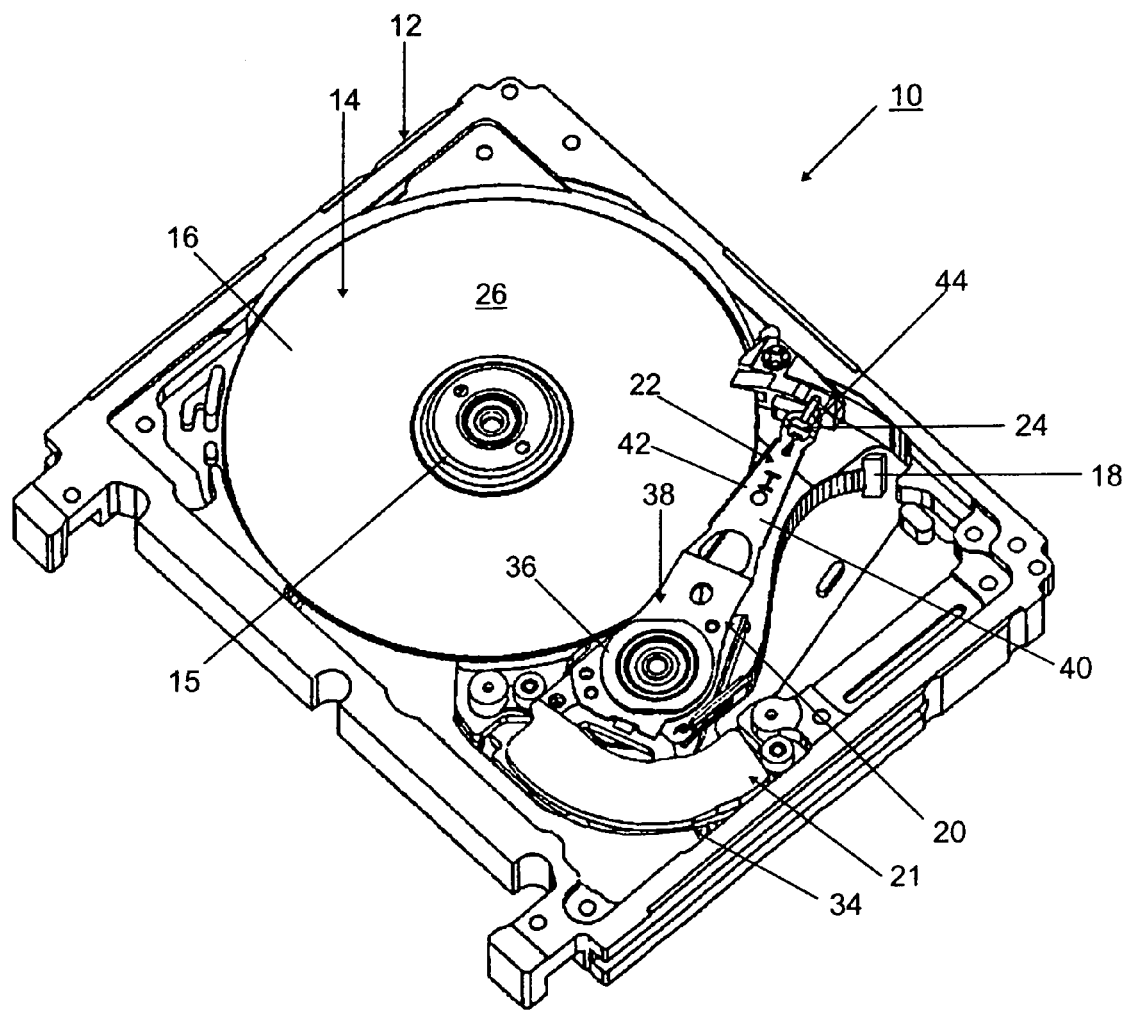
FIG. 1 is a perspective view of a disk drive having features of the present invention.

FIG. 1 illustrates a perspective view of a disk drive 10 that includes (i) a drive housing 12, (ii) a disk assembly 14 having a spindle motor 15 and one or more storage disks 16 coupled to the spindle motor 15, (iii) a drive circuitry 18, and (iv) a head stack assembly 20 including an actuator assembly 21 and one or more head suspension assemblies 22, with each head suspension assembly 22 including a slider 24.

Each storage disk 16 includes one or more disk surfaces 26 that each has a plurality of concentric data tracks (not shown) that store data, including a target track. Further, the storage disk 16 can also include non-data tracks, such as servo tracks. Data is read from the storage disk 16 during a read operation and data is transferred to the storage disk 16 during a write operation. The read and write operations can each include a seek mode during which the actuator assembly 21 rapidly moves the slider 24 to near the target track. The read and write operations can also include a settle mode which commences once the slider 24 is positioned proximate the target track. Further, the read and write operations include a track following mode once the slider 24 has settled or stabilized over the target track. Additionally, once the slider 24 stabilizes over the target track, the read and/or write operations include the transfer of data between the slider 24 and the storage disk 16.

The drive circuitry 18 sends and/or receives electrical signals from the slider 24 during read and/or write operations of the disk drive 10. In one embodiment, the drive circuitry 18 controls and/or directs current to the slider 24 to dynamically adjust and control the head-to-disk spacing. Alternatively, the drive circuitry 18 can control a voltage across portions of the slider 24 from a voltage source (not shown). In still an alternative embodiment, the drive circuitry 18 can concurrently control both the current to the slider 24 and the voltage across various portions of the slider 24.

As used herein, current, voltage and/or both current and voltage (also sometimes referred to herein as power) are generically referred to as an electrical stimulus, or simply a "stimulus". Further, an electrical signal that is received, measured or otherwise determined by the drive circuitry 18 from the slider 24 is referred to herein as an actual electrical response, or simply a "response".

The drive circuitry 18 can be included in a printed circuit board assembly (not shown). Further, the drive circuitry 18 can include one or more preamplifiers that can adjust and/or amplify the electrical signals that are transmitted between the slider 24 and other components of the drive circuitry 18. Moreover, the drive circuitry can include one or more drivers (not shown) that can control and/or direct a specific stimulus, i.e., current, voltage and/or power, to various structures within the slider 24. In one embodiment, the drive circuitry 18 is secured to and/or enclosed by the drive housing 12.

The head stack assembly 20 illustrated in FIG. 1 also includes an actuator motor 34, an actuator hub 36, one head suspension assembly 22, and an actuator arm 38. The actuator motor 34 rotates the actuator arm 38 and the head suspension assembly 22 relative to the storage disk 16. The head stack assembly 20, alternately, can include a plurality of actuator arms 38 that each supports up to two head suspension assemblies 22. Each head suspension assembly 22 includes one slider 24 and a suspension 40 having a load beam 42 and a flexure 44. The suspension 40 is secured to the actuator arm 38, and supports the slider 24 proximate one of the disk surfaces 30 of the storage disk 16.

The slider 24 transfers information between the drive circuitry 18 and the storage disk 16. The design of the slider 24 can vary pursuant to the teachings provided herein. Further, various embodiments of disk drives and slider assemblies are described in co-pending U.S. patent application Ser. No. 10/211,671, filed by McKenzie, et al. on Aug. 2, 2002, and assigned to Maxtor Corporation. The contents of U.S. patent application Ser. No. 10/211,671 are incorporated herein by reference.

Figure 2A:
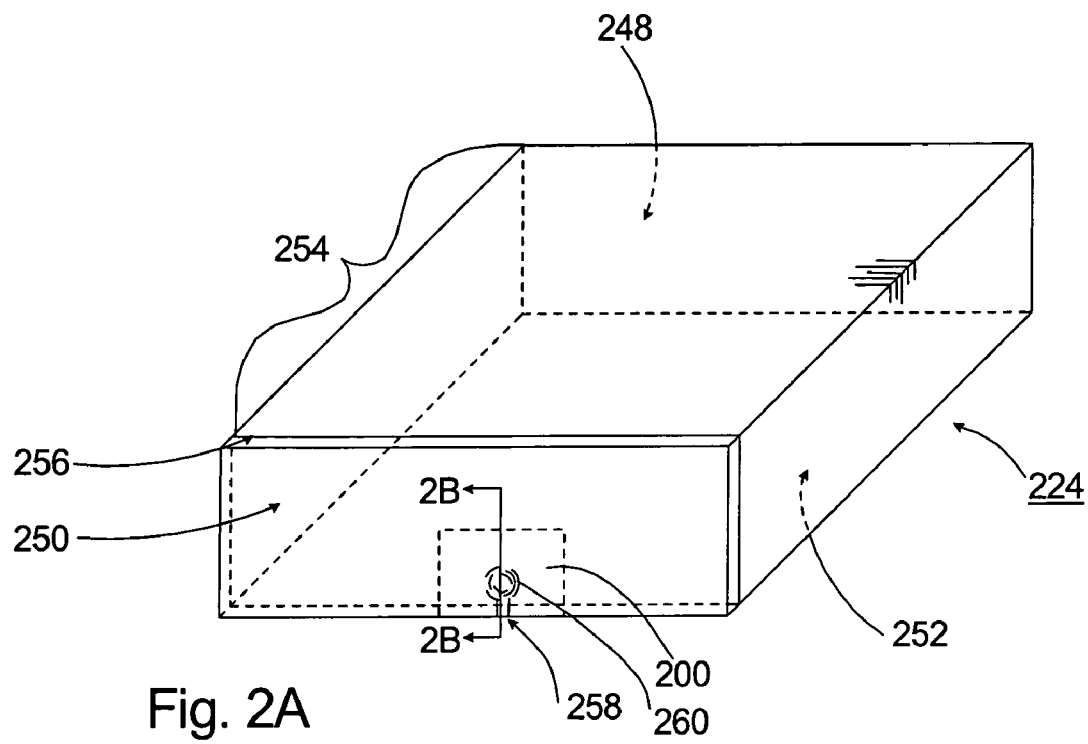
FIG. 2A is a perspective view of a slider having features of the present invention including a slider mover.

FIG. 2A illustrates a rear perspective view of one embodiment of the slider 224. In this embodiment, the slider 224 includes a read/write head 258 and a slider mover 200 (illustrated in phantom) that is selectively used to deform the slider 224 near the read/write head 258. The slider 224 includes a leading surface 248, an opposed trailing surface 250 and a bottom first surface 252, which forms an air bearing surface (ABS) of the slider 224.

Further, the slider 224 includes a body section 254, and a transducer section 256 that includes the read/write head 258. The body section 254 volumetrically represents the vast majority of the slider 224. The transducer section 256 is positioned toward the back end of the slider 224. The read/write head 258 includes a write element 260 (shown in phantom in FIG. 2A). Although the write element 260 is shown substantially centrally positioned along the transducer section 256 of the slider 224, the write element 260 can be positioned on either side of the center of the transducer section 256.

Figure 2B:
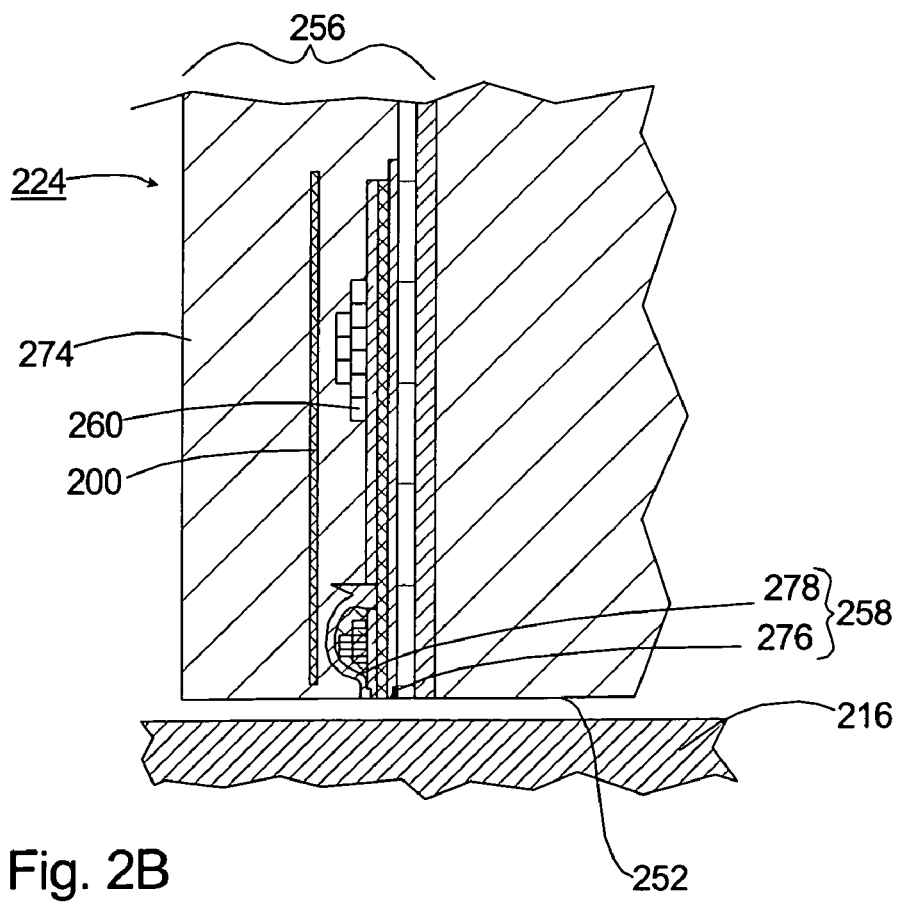
FIG. 2B is a partial cross-sectional view taken on line 2B-2B in FIG. 2A and a storage disk.

FIG. 2B is a partial cross-sectional illustration of the slider 224 shown in FIG. 2A, and a portion of a storage disk 216. FIG. 2B illustrates that the read/write head 258 includes a read head 276 and a write head 278.

The number and positioning of the slider movers 200 can be varied. In FIG. 2B, the slider 224 includes one slider mover 200 that is positioned in the transducer section 256 near the write head 278. More specifically, in this embodiment, the slider mover 200 is incorporated substantially within the overcoat layer 274 of the transducer section 256. Alternatively, one or more slider movers 200 can be positioned either partly or entirely outside the overcoat layer 274. For example, one or more slider movers 200 can be positioned or in other regions of the slider 224 or secured to an exterior surface of the slider 224.

The relative positioning, composition and geometry of the slider mover 200 can be varied to suit the design requirements of the slider 224 and the disk drive 10. In the embodiment illustrated in FIG. 2B, the slider mover 200 is a planar layer that is substantially parallel to the trailing surface 250. Alternatively, the slider mover 200 can also be positioned in alternative ways that are not parallel to the trailing surface 250. Moreover, although the slider mover 200 illustrated in FIG. 2B extends to near the air bearing surface 252 of the slider 224, other embodiments include a slider mover 200 that can actually extend to the air bearing surface 252.

In FIG. 2B, the slider mover 200 is not in direct electrical communication with the write element 260. Stated another way, the slider mover 200 can be substantially electrically isolated from the write element 260, e.g. the slider mover 200 is not in direct contact with the write element 260, nor is there any significant electrical coupling between the slider mover 200 and the write element 260. Alternatively, the slider mover 200 and the write element 260 can be electrically coupled, or they can be directly connected.

The amount in which the slider mover 200 can adjust the head-to-disk spacing will vary according to the design of the slider 224 and the slider mover 200. For example, in alternative, non-exclusive embodiments, the drive circuitry 218 can direct current to the slider mover 200 to generate power for lower the head-to-disk spacing by at least approximately 3, 4, 5, 6, 7, 8, 9, 10, or 11 nm. Further the level in which the drive circuitry 218 directs current to the slider mover 200 will vary according to the design of the slider 224, the slider mover 200, and the amount of head-to-disk spacing adjustment necessary. For example, the drive circuitry 218 can direct current to the slider mover 200 at any level that can allow the slider mover 200 to generate between approximately 0 and 100 mW of power.

In one embodiment, the slider mover 200 is formed from a material having a relatively low temperature coefficient of resistance ("TCR") and a relatively high electrical conductivity. For example, the TCR of the slider mover 200 can be approximately 0.00/° C. In another embodiment, the TCR of the slider mover 200 can have a negative value such as −0.0015/° C. In alternative, non-exclusive embodiments, the TCR of the slider mover 200 can be approximately 0.002/° C., 0.0005/° C., 0.0004/° C., 0.0001/° C., or 0.00004/° C. Suitable materials for the slider mover 200 include nickel-copper, nickel-iron or nickel-chromium alloys, copper-tin, copper-manganese, copper-gold or copper-silver alloys, aluminum, gold, copper and/or silver, as non-exclusive examples. Alternatively, other suitable electrically conductive materials or semi-conductive materials can be used to form the slider mover 200. The slider mover 200 can be geometrically configured to provide sufficiently rapid heating and/or dissipation of heat.

Figure 2C:
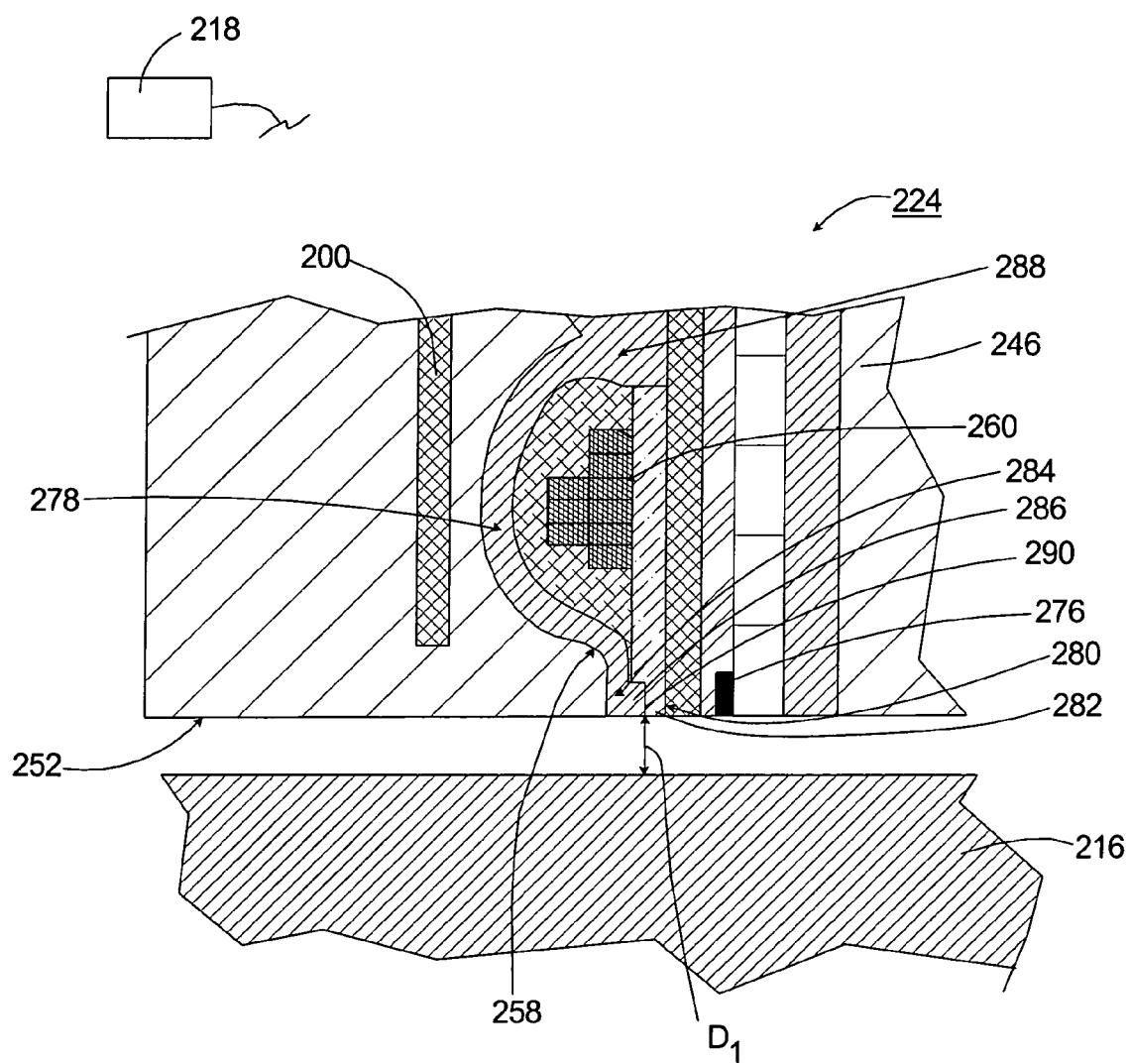
FIG. 2C is an enlarged detail view of a portion of FIG. 2B while no current is directed to the slider mover.

FIG. 2C is an enlarged view of the portion of the slider 224, the drive circuitry 218 and a portion of a storage disk 216 illustrated in FIG. 2B. The read head 276 receives information from the rotating storage disk 216. The information is transferred to the drive circuitry 218 for further processing.

The positioning and design of the write head 278 can be varied. In FIG. 2C, the write head 278 includes a leading pole 280 having a leading pole tip 282, a trailing pole 284 having a trailing pole tip 286, a yoke 288, and a write head gap 290.

More specifically, FIG. 2C illustrates the general relationship between the head-to-disk spacing $D_1$ when the drive circuitry 218 is not directing current to the slider 224. At various times during operation of the disk drive, no current is directed to the slider 224, and little or no deformation caused by the slider mover 200 and/or the read/write head 258 occurs in the area of the read/write head 258 or the air bearing surface 252, as illustrated in FIG. 2C.

Figure 2D:
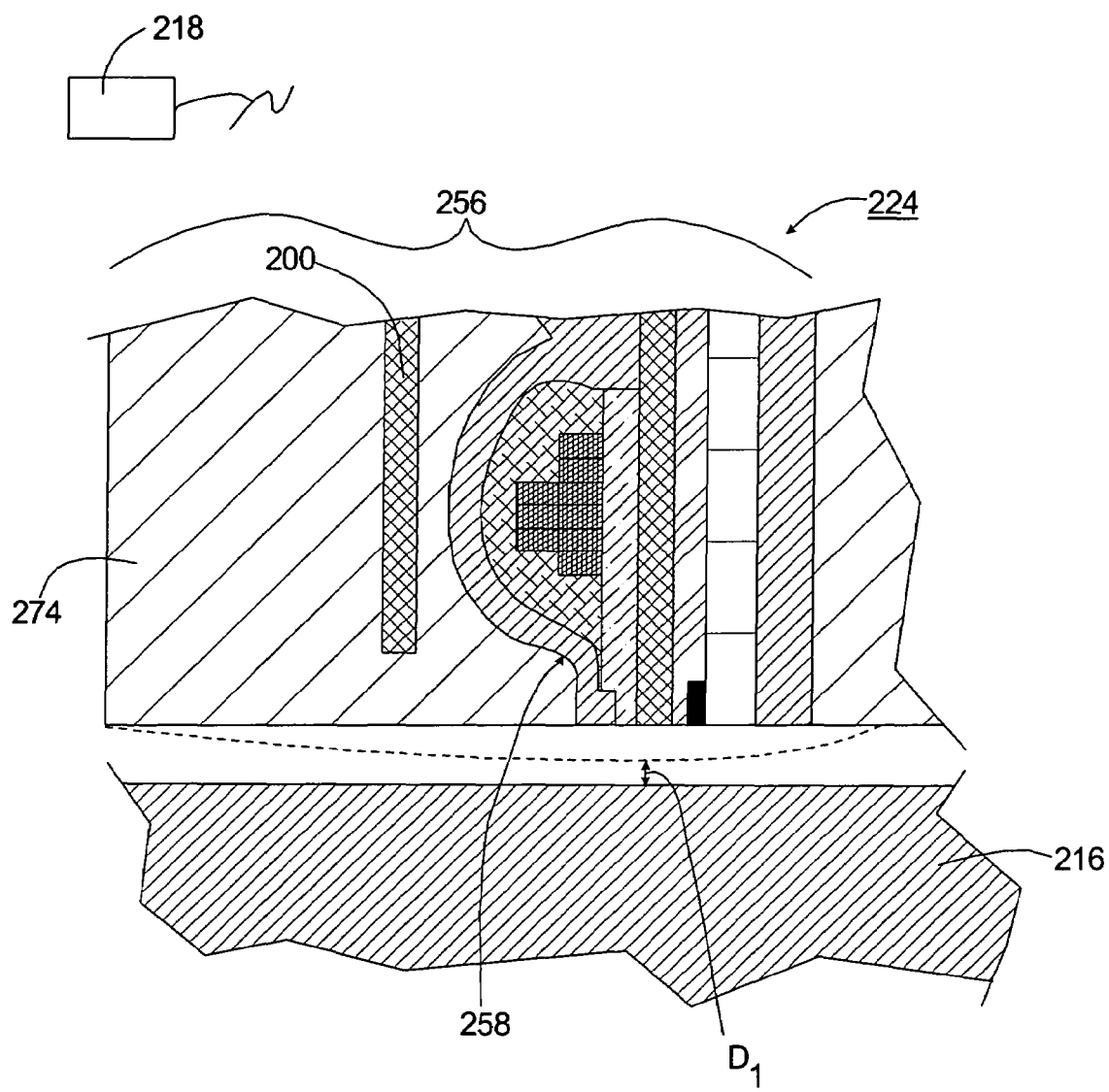
FIG. 2D is an enlarged detail view of a portion of FIG. 2B while a first level of current is directed to the slider mover.

FIG. 2D illustrates the relationship between the head-to-disk spacing $D_1$ that occurs after the drive circuitry 218 directs a first level of current to the slider mover 200. In one embodiment, current from the drive circuitry 218 can cause the slider mover 200 to generate heat independently from any heat generated by the read/write head 258 or other regions of the slider 224. The heat from the slider mover 200 is transferred to the immediately surrounding area, which can include the overcoat layer 274 and the read/write head 258, thereby selectively causing thermal deformation of the transducer section 256 independently from the deformation caused by heating of the read/write head 258 during a read or write operation.

In FIG. 2D, the first level of current is such that the slider mover 200 thermally causes expansion of a portion of the slider 224 near the read/write head 258, in a direction toward the storage disk 216. However, the first level of current is not sufficient to cause the slider 224 to expand such that any portion of the slider 224 contacts the storage disk 216. As referred to herein, when the head-to-disk spacing is greater than 0 nm (as illustrated in FIGS. 2C and 2D), the slider is in a first position.

Figure 2E:
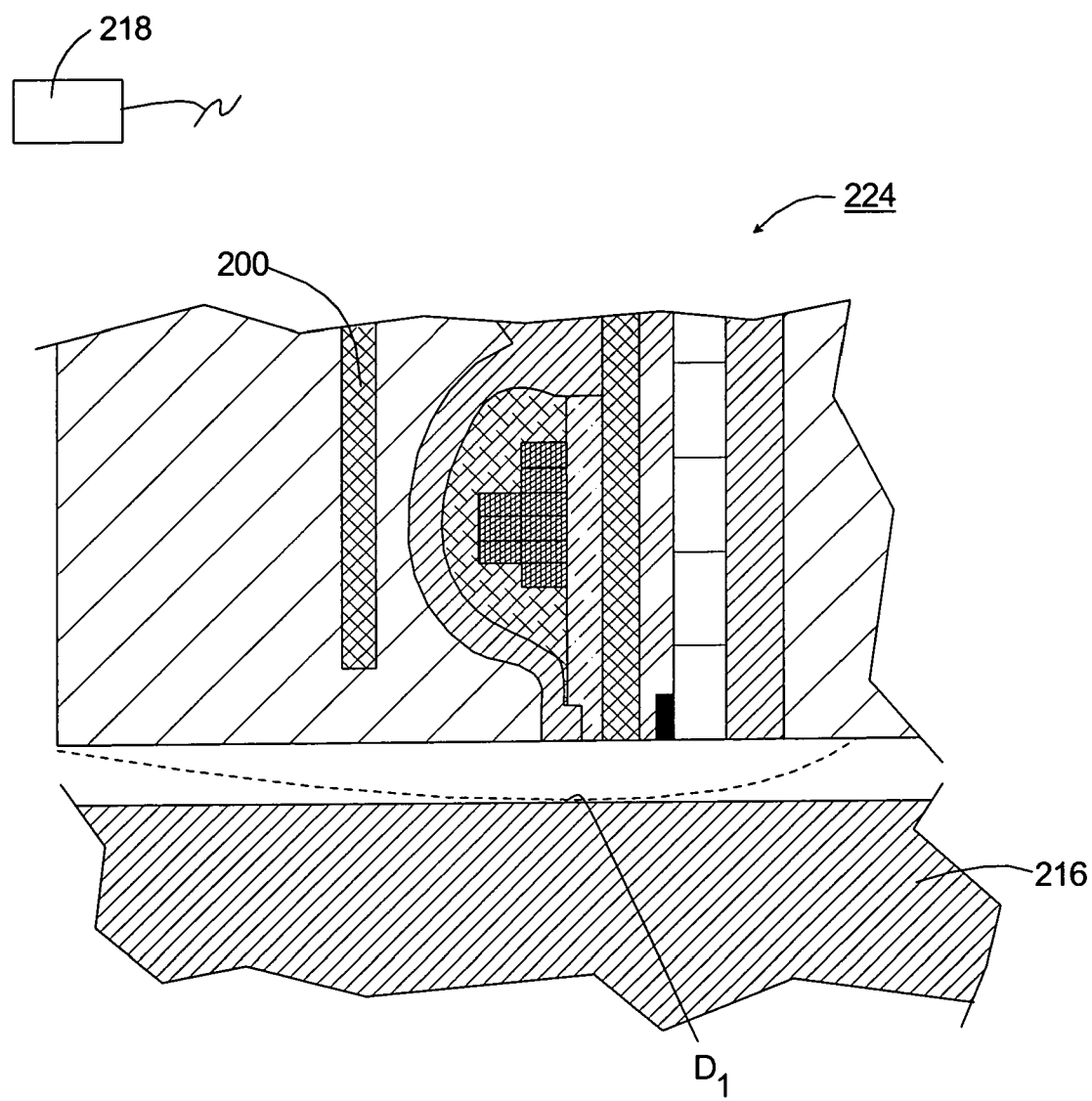
FIG. 2E is an enlarged detail view of a portion of FIG. 2B while a second level of current is directed to the slider mover.

FIG. 2E illustrates the relationship between the head-to-disk spacing $D_1$ that occurs after the drive circuitry 218 directs a second level of current to the slider mover 200. In FIG. 2E, the second level of current represents at least a minimum amount of current to cause sufficient thermal expansion of a portion of the slider 224 that results in non-destructive, physical contact between the slider 224 and the storage disk 216, as illustrated in FIG. 2E. Such contact between the slider 224 and the storage disk 216 is also referred to herein as "head-to-disk contact", where $D_1$ is approximately equal to 0 nm. As referred to herein, upon head-to-disk contact, the slider is in a second position, as illustrated in FIG. 2E.

Although the deformation represented in FIGS. 2D and 2E illustrates a somewhat smooth curve, it is recognized that the actual deformation may not occur in this manner. For example, the deformation may result in a portion of the air bearing surface having additional angles, corners, multiple facets or other surfaces that are not substantially smooth as illustrated in FIGS. 2D and 2E.

Consistent contact between the slider 224 and the storage disk 216 is also referred to herein as "head-to-disk contact", and the head-to-disk spacing is approximately equal to 0 nm. As used herein, head-to-disk contact is distinguished from sporadic or anomalous contact that occurs when the slider 224 contacts a thermal asperity (not shown) or some other surface deviation on the storage disk 216, which normally has a duration on the order of less than one microsecond up to approximately 3 microseconds in some cases.

In contrast, head-to-disk contact as used herein has a duration that is sufficient to establish non-anomalous contact between the slider 224 and the storage disk 216, such as a relatively consistent flying height of 0 nm. Stated another way, the disk drive 10 and methods provided herein facilitate a determination of head-to-disk contact having a requisite duration that establishes a substantially constant flying height or head-to-disk spacing of 0 nm. In one embodiment, head-to-disk contact has a duration that is greater than approximately 10 microseconds. In alternative non-exclusive embodiments, head-to-disk contact can have a duration that is greater than approximately 25, 50, 100, 500, 1,000 or 2,000 microseconds which is recognized by one or more of the methods provided herein. Head-to-disk contact of this relatively long duration clearly establishes non-anomalous contact between the read/write head 258 and the storage disk 216.

As provided herein, head-to-disk contact for one or more read/write heads 258 in the disk drive can be intentionally induced during manufacture, production and/or self-testing of the disk drive, and/or on a predetermined (automatic) or an "as needed" (manual) basis during in situ operation of the disk drive. For example, head-to-disk contact can be intentionally caused during self-testing and/or during optimization testing of the disk drive. In one embodiment, by purposely causing non-destructive head-to-disk contact or withdrawing from non-destructive head-to-disk contact, and by providing the ability to detect when the slider 224 changes between the first position and the second position (in either direction), one or more read/write heads 258 in the disk drive can be separately or concertedly calibrated to more accurately determine, monitor and/or adjust the head-to-disk spacing during various operations of the disk drive.

For example, as provided herein, the drive circuitry can very promptly detect approximately when the slider 224 contacts the storage disk 216 (changing from the first position to the second position). Alternatively or in addition, the drive circuitry 218 can detect approximately when the slider 224 is withdrawn from contact with the storage disk 216 (changing from the second position to the first position).

Head-to-disk contact provides a zero-clearance reference that is used in various applications relative to head-to-disk spacing, as set forth herein. Once the zero-clearance reference point is established, the drive circuitry 218 can monitor relative changes in head-to-disk spacing, and can also accurately determine and facilitate adjustment of the actual head-to-disk spacing at any time during operation of the disk drive. With this design, the disk drive can operate at more a suitable head-to-disk spacing depending upon the specific operation being performed.

Head-to-disk contact can be induced by directing current to the slider mover 200 while the slider 224 is flying during rotation of the storage disk 216 to cause a portion of the slider 224 to deform toward the storage disk 216. Current to the slider mover 224 can be maintained or increased until head-to-disk contact is determined by one of the methods provided herein. Moreover, head-to-disk contact can be induced without the need for changing, e.g., decreasing then increasing, the nominal rotational velocity (normal operating speed) of the storage disk 216. Thus, the rotational velocity of the storage disk 216 can be maintained both during and following inducement and detection of head-to-disk contact. With this design, power is conserved because the rotational speed is not substantially changing, damage to the slider 224 and/or storage disk 216 is inhibited due to the more rapid detection of head-to-disk contact, and firmware is simplified because coordination and adjustment of the velocity of the disk spindle 15 (illustrated in FIG. 1) is not required.

Figure 3:
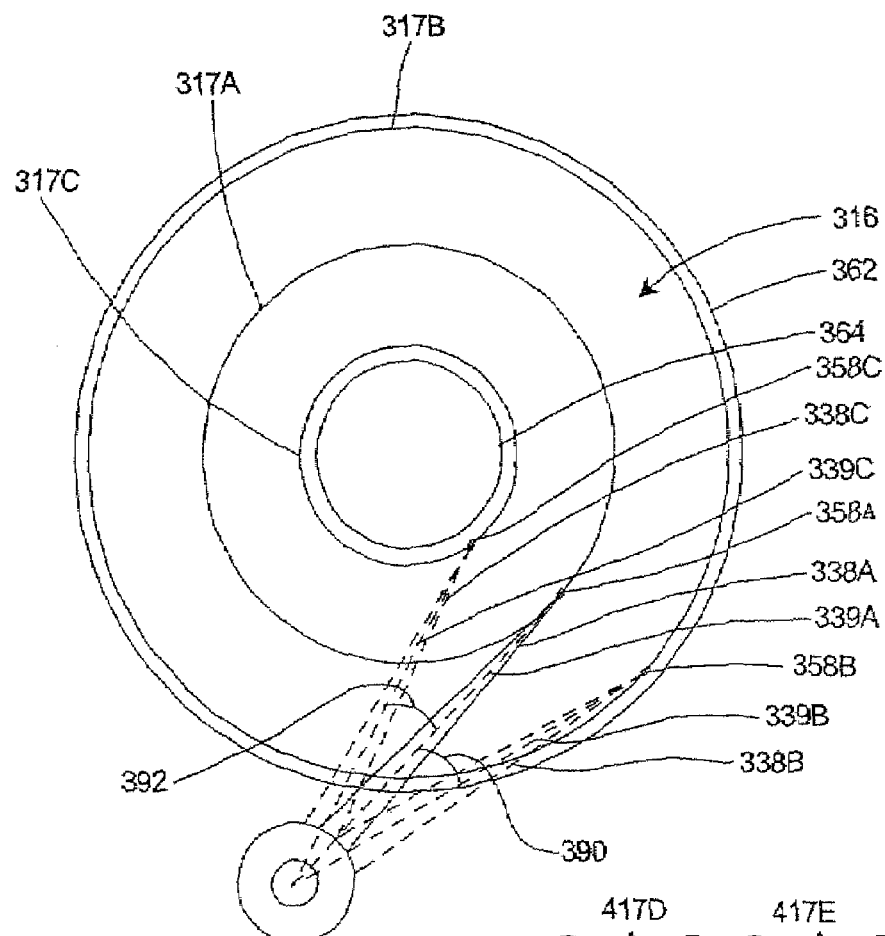
FIG. 3 is a simplified top view of a storage disk and an actuator arm illustrated at three different skew angles.

FIG. 3 is a simplified representation of a portion of a disk drive illustrating three different positions of an actuator arm 338A-C relative to the storage disk 316. The orientation of the actuator arm 338A-C relative to the storage disk 316 is also referred to herein as the skew angle. For example, at a zero skew angle, a longitudinal axis 339A of the actuator arm 338A forms a line tangent to a first track 317A at the point of track following by a first read/write head 358A. Thus, when the first read/write head 358A is positioned over the first track 317A, the actuator arm 338A is at the zero skew angle (also referred to herein as "zero skew").

The actuator arm 338B is positioned at a positive skew angle 390 when the actuator arm 338B moves away from zero skew toward the outer diameter 362 of the storage disk 316. FIG. 3 shows an actuator arm 338B (in phantom) having second read/write head 358B positioned at a positive skew angle 390 over a second track 317B. The actual skew angle of the actuator arm 338B is determined by the angle of the longitudinal axis 339B relative to the longitudinal axis 339A at zero skew.

The actuator arm 338C is positioned at a negative skew angle 392 when the actuator arm 338C moves away from zero skew toward an inner diameter 364 of the storage disk 316. FIG. 3 shows an actuator arm 338C (in phantom) having a third read/write head 358C positioned at a negative skew angle 392 over a third track 317C. The actual skew angle of the actuator arm 338C is determined by the angle of the longitudinal axis 339C relative to the longitudinal axis 339A at zero skew. The range of skew angles 390, 392 can vary depending upon the design requirements of the disk drive, but in one embodiment, the skew angles can range between approximately ±18 degrees from zero skew.

Figure 4:
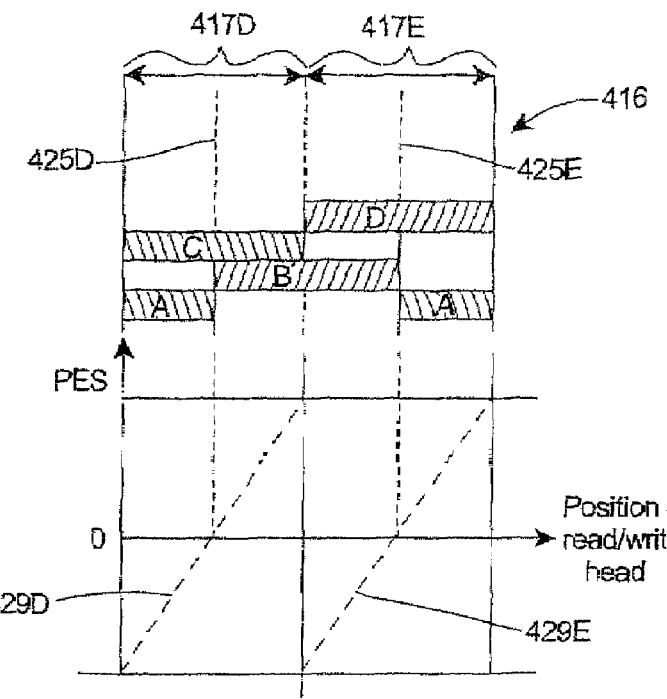
FIG. 4 is a representation of a portion of a first track and an adjacent second track of a storage disk in relation to a position error signal.

FIG. 4 is a representation of a portion of a first track 417D and an adjacent second track 417E of a storage disk 416, along with a graph of PES as a function of positioning of the read/write head. One method of determining the positioning accuracy of the read/write head relative to a centerline 425D of the first track 417D, for example, is by monitoring a position error signal ("PES") variance (also sometimes referred to herein as "modulation"). The PES (illustrated by dashed line 429D) is a voltage signal having an amplitude having an absolute value that generally increases as the read/write head moves further off the centerline 425D of the first track 417D.

In one embodiment of the present invention, changes between head-to-disk contact and non-head-to-disk contact can be determined by monitoring the PES variance at certain designated tracks (such as tracks 417D and 417E illustrated in FIG. 4) on the storage disk 416. As an overview, the PES variance method essentially includes monitoring changes in the PES as an increasing or decreasing level of current is directed to the slider mover. In the embodiment using an increasing level of current, once the PES deviates by a predetermined amount from the PES during non-head-to-disk contact, head-to-disk contact can be assumed or definitively determined to have occurred. Conversely, in the embodiment that uses a decreasing level of current, once the PES deviates by a predetermined amount from the PES during head-to-disk contact, non-head-to-disk contact can be assumed or definitively determined to have occurred, as explained in greater detail below.

In one embodiment, the PES 429D can be derived from one or more servo burst patterns A-D positioned at fixed offsets from the centerline 425D of the first track 417A. Typically, the PES 429D is received by the drive circuitry, and this information can be used to adjust the positioning of the read/write head relative to the centerline 425D of the first track 417D. As used herein, the first track 417D and the second track 417E can be representative of any track on the storage disk 416.

Normally, when head-to-disk contact occurs at certain skew angles, a sudden change of direction of a force at the actuator arm occurs. Based on physics principles and/or experimental testing at certain ranges of skew angles on the storage disk 416, it is recognized that actual head-to-disk contact results in an increase in the likelihood that the read/write head will suddenly move away from a centerline 425D, 425E of the track 417D, 417E being followed.

For example, when the slider is positioned near the inner diameter of the storage disk 416, because of the rotation of the storage disk 416 in relation to the negative skew angle, head-to-disk contact causes the slider to suddenly move off-track in an outwardly direction. On the other hand, when the slider is positioned near the outer diameter of the storage disk 416, because of the rotation of the storage disk 416 in relation to the positive skew angle, head-to-disk contact causes the slider to suddenly move off-track in an inwardly direction. Rotation of the storage disk 416 in an opposite direction can yield results opposite from those provided above. This sudden movement of the slider is detected by the servo system as a change and/or increase in the amplitude of the PES, which is detected very shortly after the sudden movement. For instance, the time constant of a PES change following head-to-disk contact can be on the order of approximately 0.3 milliseconds or less.

Stated another way, if the amplitude of the PES is a predetermined level greater than what would normally be expected at a given skew angle during track following by the read/write head, the likelihood that head-to-disk contact has occurred is increased. Generally, the greater the deviation in PES from the PES values expected during track following, the higher the confidence level is that head-to-disk contact has actually occurred. For example, if the PES exceeds the expected PES values at a given skew angle by at least a predetermined percentage, head-to-disk contact can be assumed with a relatively high degree of certainty. Alternatively, if the PES exceeds the expected PES values at a given skew angle by a greater predetermined percentage, the occurrence of head-to-disk contact can be definitively established. An evaluation and/or monitoring of PES to determine head-to-disk contact can include monitoring mean PES, peak PES, peak-to-peak PES, changes in PES and/or any other suitable PES criteria.

The specific skew angles that can be used for determining head-to-disk contact by monitoring PES variance can be varied. In one embodiment, the PES can be monitored and used to determine head-to-disk contact at any skew angle. Alternatively, this type of PES monitoring to assess head-to-disk contact can be used at non-zero skew angles, which can increase PES variance. Still alternatively, this type of PES monitoring to determine head-to-disk contact can be used at skew angles of greater than approximately positive one degree, and/or less than approximately negative one degree. In another embodiment, this type of PES monitoring to determine head-to-disk contact can be used at skew angles of greater than approximately positive five degrees, and/or less than approximately negative five degrees. It is recognized that deviations in the actual PES values from the expected PES values generally increases as the skew angle moves further from zero skew. Thus, with this method, head-to-disk contact can be more definitively determined the further from zero skew the actuator arm is positioned, e.g. more toward the inner or outer diameter of the storage disk 416.

In certain embodiments, the expected PES values and the percentage of variance from such values required to determine a change between head-to-disk contact and non-head-to-disk contact (in either direction) within a specific degree of certainty can be statistically or algorithmically calculated. Alternatively, the expected PES values and the percentage of variance from such values required to determine a change between head-to-disk contact and non-head-to-disk contact within a specific degree of certainty can be established through experimental testing.

In one embodiment, depending upon the skew angle, if the deviation of PES values from the PES values during track following is at least approximately 10%, head-to-disk contact can be assumed to have occurred. In alternative non-exclusive embodiments, depending upon the skew angle, if the deviation of PES values from the PES values during track following is at least approximately 1%, 5%, 20%, 30%, 40%, 50%, 75%, or 100%, the occurrence of head-to-disk contact can be assumed at a particular confidence of less than or up to 100%.

The PES can be monitored at varying levels of current directed to the slider mover, and thus, at varying amounts of power output of the slider mover. Further, the PES can be monitored at different skew angles. For example, at a given skew angle, the PES can first be monitored at a relatively low level of current, or when no current is directed to the slider mover. The current can be incrementally or otherwise gradually increased to lower a portion of the slider toward the storage disk to decrease the head-to-disk spacing. The PES is monitored at each current level. Alternatively, as varying levels of current are applied to the slider mover, the PES can be monitored as a function of the power output of the slider mover.

As explained previously, as current to the slider mover is increased, the power output of the slider mover increases, causing a portion of the slider near the read/write head to thermally expand toward the storage disk. However, at a certain current level directed to the slider mover, thermal expansion results in head-to-disk contact. At this point, a deviation from the expected PES value can be determined by the drive circuitry. Depending upon the extent of the deviation from the normal PES curve, a specific confidence level that head-to-disk contact has occurred can be established. By performing this type of monitoring process at various skew angles, the confidence level of head-to-disk contact at a given percentage of variance from the expected PES curve can effectively be increased.

Figure 5:
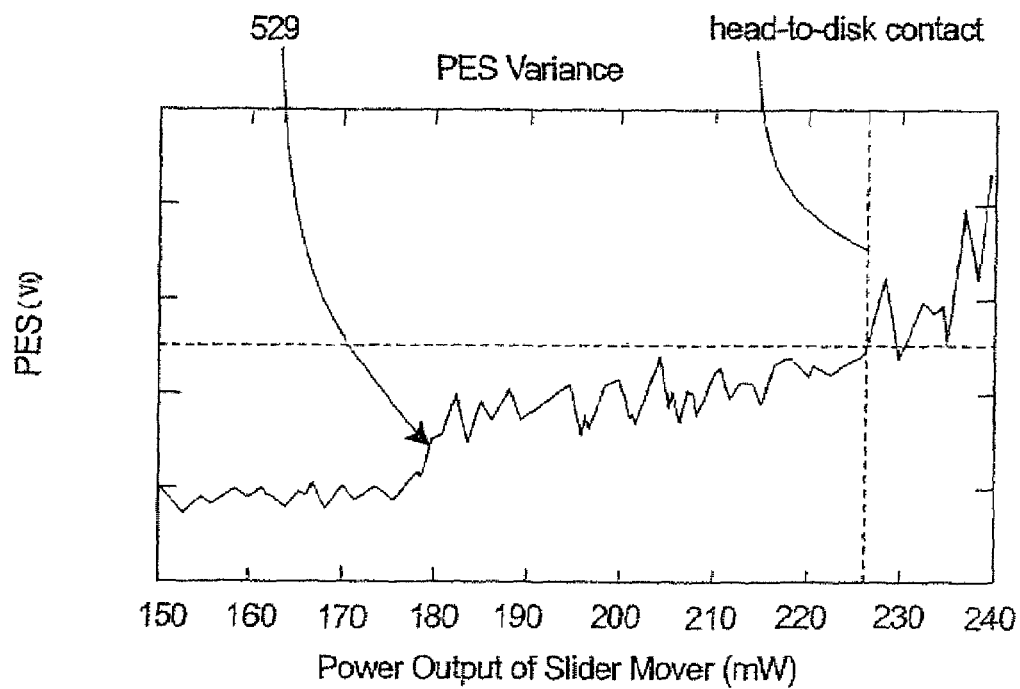
FIG. 5 is a graphical representation of position error signal variance versus power output of the slider mover resulting from current directed to the slider mover by a drive circuitry.

FIG. 5 is a graphical representation of PES 529 as a function of power output of the slider mover resulting from current directed to the slider mover by the drive circuitry. As the power output of the slider mover gradually increases, the change in PES 529 can be expected to be substantially linear or somewhat gradual. However, at a certain threshold point, the PES 529 increases significantly, indicating that the read/write head has moved away from the centerline of the track being followed. This significant change in PES 529 indicates that head-to-disk contact has occurred.

Thus, during manufacture and/or testing of a given disk drive, the level of current directed to the slider mover that will likely cause head-to-disk contact can be determined for any given slider at any suitable skew angle. Further, during manufacture and/or testing, the level of current that will result in head-to-disk contact at various times during operation of the disk drive can be determined. For example, this information can be used in order to reduce the likelihood of unwanted head-to-disk contact during a read operation, a write operation or other types of operations, as examples.

Alternatively, or in conjunction with the above embodiment, head-to-disk contact can be detected using a synchronous PES method. As an overview, the synchronous PES method includes monitoring the modulation of the PES at various rotational locations on the storage disk, and is based on the specific frequency of rotation of the storage disk.

In one embodiment using the synchronous PES method, the PES can be monitored at any non-zero skew angle. In an alternative embodiment, the PES can be monitored at any skew angle having an absolute value of greater than approximately 1 degree. In another embodiment, the PES can be monitored at any skew angle having an absolute value of greater than approximately 5 degrees.

Using the synchronous PES method, monitoring of the PES is associated with the frequency of rotation of the storage disk. Because the rotation rate of the storage disk in the disk drive is known, in one embodiment, current to the slider mover to cause thermal expansion of the slider can be turned on and off, or increased and decreased, based on this rotation rate. For example, at a particular skew angle, a specific level of current can be directed to the slider mover to cause thermal expansion of the slider during every other revolution of the storage disk.

The duration of directing current to the slider mover can be approximately equal to the time required for the storage disk to rotate one complete revolution. For instance, in a disk drive having a storage disk that rotates at 7,200 revolutions per minute (120 Hz), the duration of each revolution is 1/120 of a second. Therefore, in this embodiment, the duration of current being directed to the slider mover is also 1/120 of a second, lasting for one complete revolution. In one embodiment, the current to the slider mover can then be arrested for 1/120 of a second (the next revolution of the storage disk). Thus, the current to the slider mover commences once every 1/60 of a second, and lasts for 1/120 of a second before the current is arrested for 1/120 of a second. This cyclic process can be repeated any number of times in succession, or with a time lag between such cycles.

Figure 6A:
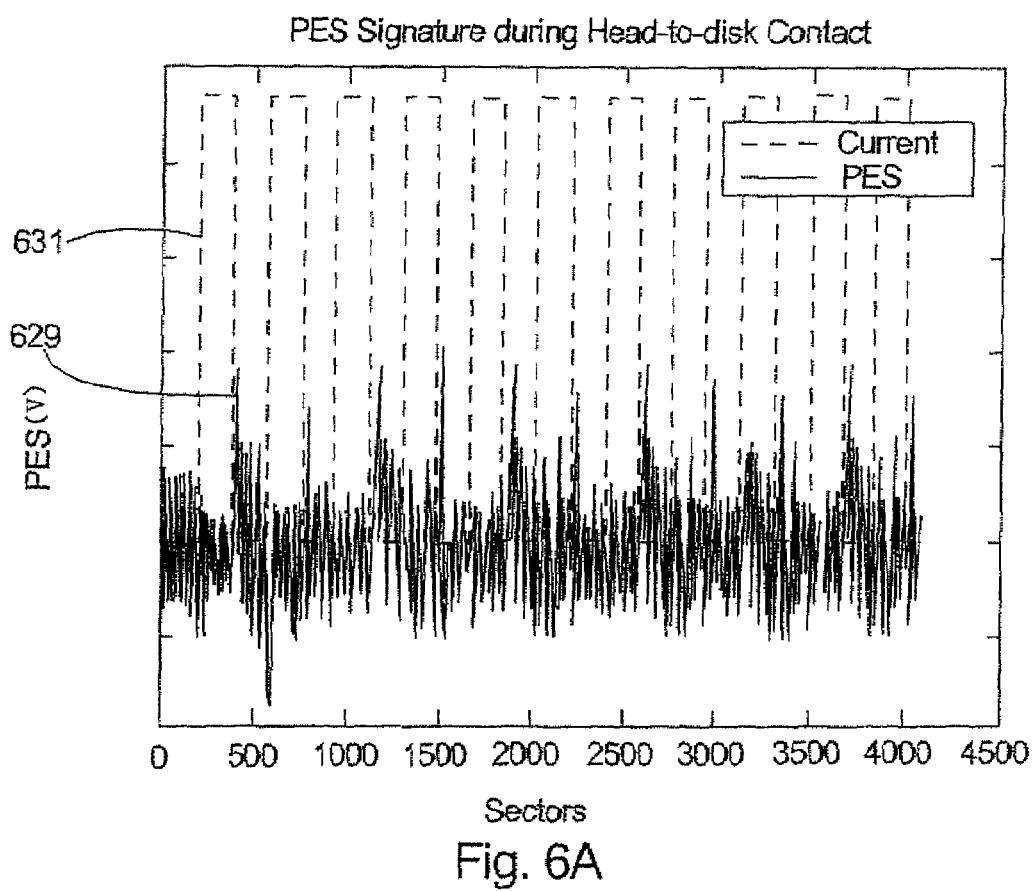
FIG. 6A is a graphical representation of the position error signal as a function of time, while alternately turning current on and off to the slider mover.

FIG. 6A is a graphical representation of the PES 629 as a function of time, while alternately turning current on and off to the slider mover. The current to the slider mover is illustrated by a square wave shown by dashed line 631. In FIG. 6A, time is measured by the number of servo sectors that are read by the read head. In this embodiment, each rotation of the storage disk includes reading approximately 200 servo sectors. Thus, in the embodiment represented by the graph in FIG. 6A, current is repeatedly directed to the slider mover for one complete revolution, then not directed to the slider mover for one complete revolution.

FIG. 6A illustrates that the amplitude of the PES 629 spikes immediately following a change in directing current to the slider mover. For example, when current to the slider mover is turned on, a nearly immediate spike in the amplitude of the PES 629 is detected. Moreover, when the current to the slider mover is turned off, a nearly immediate spike in the amplitude of the PES 629 in the opposite direction is detected. The spikes in the amplitude of the PES 629 which are detected by the servo system are attributable to one of two sudden changes: (1) head-to-disk contact has just occurred, or (2) the read/write head has just withdrawn from contact with the storage disk. Following each such spike, the servo system can adjust the positioning of the slider, and thus the read/write head, which causes the amplitude of the PES 629 to diminish until the next change in directing current to the slider mover occurs at the predetermined interval, in this example.

Figure 6B:
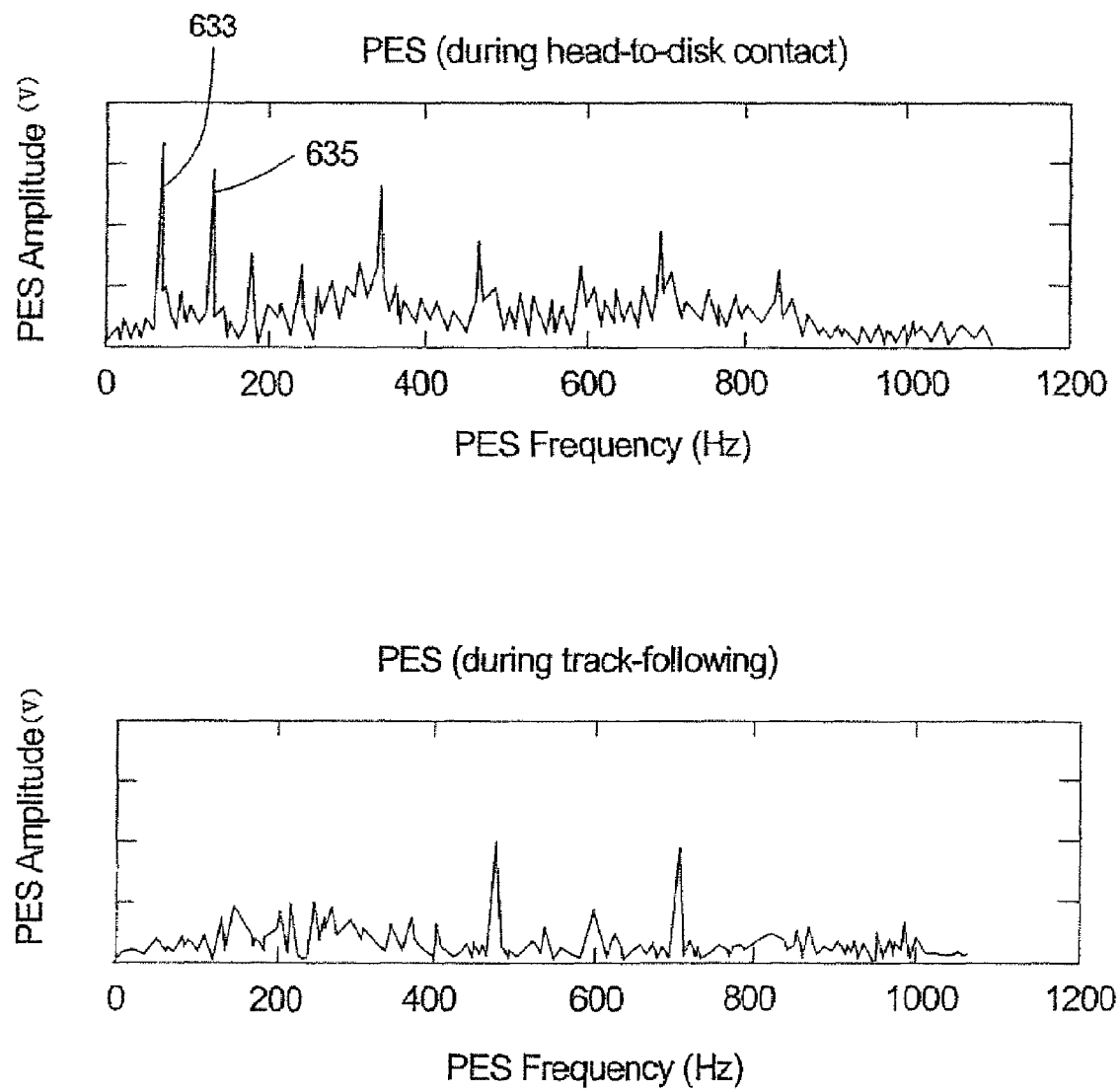
FIG. 6B is a graphical comparison of the amplitude of the position error signal as a function of the frequency of the position error signal, both during head-to-disk contact and during track following.

FIG. 6B illustrates graphical comparisons of the amplitude of the PES as a function of the frequency of the PES, both during head-to-disk contact and during track following. As shown in the upper graph in FIG. 6B, during head-to-disk contact, a spike 633 in the amplitude of the PES occurs at approximately 60 Hz because this is the fundamental frequency in this example. Stated another way, in this embodiment, current is directed to the slider mover once approximately every 1/60 of a second (for a duration of 1/120 of a second). Further, as explained above, a spike 635 in the amplitude of the PES occurs at a frequency of approximately 120 Hz because the drive circuitry is alternately turning directing current and arresting current to the slider mover every 1/120 of a second. The harmonics of this system also cause short duration increases in the amplitude of the PES that continually diminish as the frequency increases beyond 120 Hz.

The lower graph in FIG. 6B illustrates that during track following, relatively little PES activity occurs at lower frequencies such as the fundamental frequency, and multiples of the fundamental frequency. In other words, the spikes 633, 635 in amplitude observed in the upper graph in FIG. 6B are not observed during track following. However, at somewhat higher frequencies, i.e. 240 Hz, 480 Hz, and 720 Hz, etc., relatively small increases in the amplitude of the PES do occur. Because the frequencies of these increases in the PES are several multiples higher than the fundamental frequency, and are similar to the increases observed in the upper graph in FIG. 6B at those same frequencies, such increases in amplitude are attributable to causes other than head-to-disk contact, e.g., causes related to disk rotation such as disk wobble, spindle motor noise, etc.

By repetitiously and consistently comparing PES with current to the slider mover alternately being turned on and off, extraneous noises that are unrelated to head-to-disk contact can basically be discounted or disregarded, leaving behind a relatively unique PES frequency pattern. This PES frequency pattern can be attributable to the occurrence of head-to-disk contact. With this design, because extraneous noise has effectively been removed from the analysis, the signal to noise ratio is increased, providing a more accurate determination of the timing of the onset of head-to-disk contact.

As used herein, convergence time is the point in time at which a definitive determination of head-to-disk contact occurs. Once the unique PES frequency pattern is identified, a single point method could be applied to speed up the convergence time of the sine and cosine coefficients as shown in the following equations:

$$B = \frac{2}{\text{N\_HSEC} \cdot \text{REV}} \sum_{i=1}^{REV2} \sum_{k=0}^{N-1} y(k)\cos\left(\frac{\pi}{\text{N\_HSEC}}k\right) \quad (1)$$

$$A = \frac{2}{\text{N\_HSEC} \cdot \text{REV}} \sum_{i=1}^{REV2} \sum_{k=0}^{N-1} y(k)\sin\left(\frac{\pi}{\text{N\_HSEC}}k\right)$$

where REV is an even number. Since only the amplitude in the synchronous PES method is important, the onset of head-to-disk contact can be determined by $A^2+B^2$ from equation 1 above.

Figure 6C:
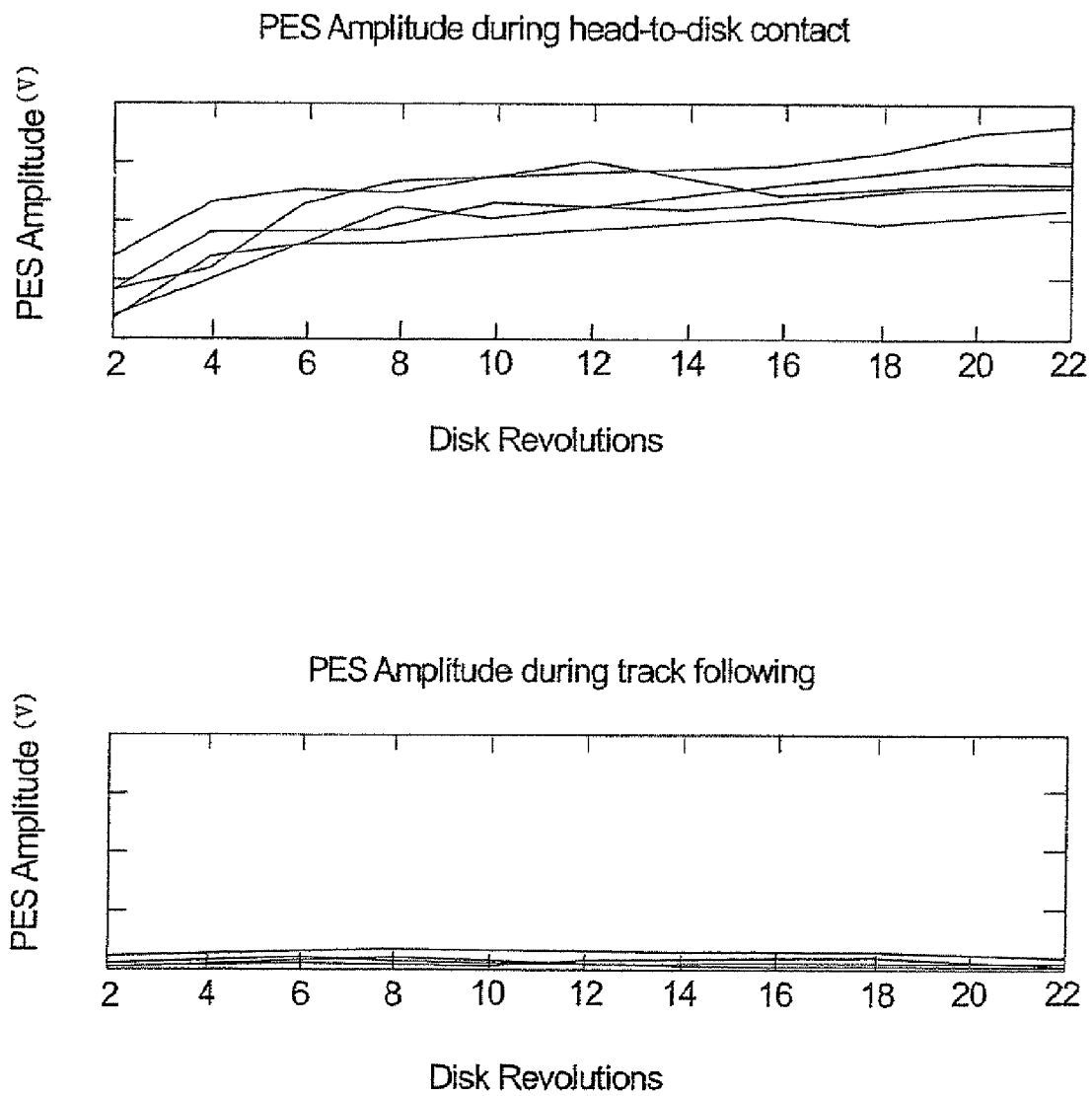
FIG. 6C is a graphical comparison of a convergence time for the amplitude of the position error signal as a function of revolutions of the storage disk, both during head-to-disk contact and during track following.

FIG. 6C graphically illustrates the convergence time of the amplitudes of the PES (upper graph in FIG. 6C), which occurs at approximately 20 revolutions. As used herein, the convergence time is the time (measured in number of revolutions of the storage disk) at which the amplitude of the PES levels off and remains relatively consistent. For example, in a disk drive having a storage disk that rotates at approximately 7,200 revolutions per minute, 20 revolutions translates to approximately one-sixth of a second. However, the amplitudes of the PES during track following (lower graph in FIG. 6C) are relatively small compared to the amplitudes of the PES during even the first several revolutions following directing current to the slider mover. Thus, as shown in the upper graph in FIG. 6C, in some embodiments, head-to-disk contact can be detected before 20 revolutions of the storage disk have occurred.

For example, in one embodiment, if the amplitude of the PES is a predetermined percentage larger than the PES during track following, the drive circuitry can determine that head-to-disk contact has occurred within as few as approximately two revolutions of the storage disk, or within approximately $1/60$ of a second. In another embodiment, the amplitude of the PES can be large enough for the drive circuitry to determine that head-to-disk contact has occurred within as few as approximately four revolutions, or within approximately $1/30$ of a second.

Further, in one embodiment of the synchronous PES method, at a given skew angle head-to-disk contact is determined to have occurred when the amplitude of the PES is at least approximately 10% greater than the amplitude of the PES during track following. In alternative non-exclusive embodiments, head-to-disk contact is determined to have occurred when the amplitude of the PES is at least approximately 1%, 5%, 20%, 50%, 100%, 200%, 300%, 400% or 500% greater than the amplitude of the PES during track following. An evaluation and/or monitoring of PES to determine head-to-disk contact can include monitoring mean PES, peak PES, peak-to-peak PES, changes in PES and/or any other suitable PES criteria.

Figure 6D:
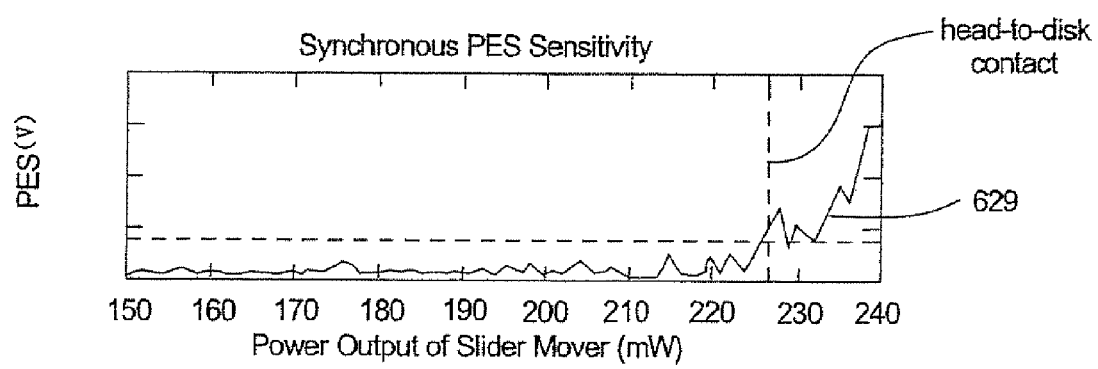
FIG. 6D is a graphical representation of the relationship between power output of the slider mover and the amplitude of the position error signal.

FIG. 6D is a graph showing the relationship between power output of the slider mover and the amplitude of the PES 629. FIG. 6D illustrates that once a relatively low threshold of PES amplitude has been exceeded, head-to-disk contact can be determined to have occurred. In this example, as power output of the slider mover increases up to approximately 220 mW, relatively little change in a baseline PES amplitude occurs, indicative of no head-to-disk contact. However, at a level of between approximately 220-230 mW, a substantial increase in the PES amplitude as a function of percentage greater than baseline occurs. This easily noticeable increase in PES amplitude provides an early detection of head-to-disk contact. With this design, fewer revolutions of the storage disk are required to accurately ascertain the moment of head-to-disk contact, resulting in a decreased likelihood of damage to the slider and/or the storage disk.

Using the synchronous PES method described herein, the change in positioning of the read/write head relative to the centerline of the track can be consistently analyzed because head-to-disk contact is repeatedly occurring at substantially the same location on the storage disk. Further, withdrawal of the read/write head from contact with the storage disk is also repeatedly occurring at substantially the same location on the storage disk. Because the extraneous noise is reduced, an accurate analysis can be performed by the drive circuitry to determine the moment of head-to-disk contact. With this design, a zero reference point, e.g. head-to-disk spacing equals 0 nm, is more precisely defined, which allows the drive circuitry to more accurately determine and adjust the in situ head-to-disk spacing.

In an alternative embodiment, current to the slider mover can be timed so that the current cyclically starts, stops and starts again at some multiple of the fundamental frequency of the storage disk, i.e. at 4.0, 2.0, 0.5, 0.25, 0.125, etc., times the fundamental frequency. For example, the current can be directed and arrested to the slider mover at a rate that is faster than the rotation rate of the storage disk, such as every $1/120$ of a second for $1/240$ of a second. In this embodiment, the storage disk rotates approximately one-half of a revolution while the current to the slider mover is on, and the next one-half of a revolution while the current to the slider mover is off. This cycle is repeated as many times as necessary.

In another embodiment, the current directed to the slider mover can be turned on at a rate that is slower than the rotation rate of the storage disk, such as every $1/30$ of a second for $1/60$ of a second. In this embodiment, the storage disk rotates approximately two revolutions while the current to the slider mover is on, and the next two revolutions while the current to the slider mover is off, repeating as necessary. In still an alternative embodiment, the cyclic on/off directing of current to the slider can be unrelated to the rotation rate of the storage disk, provided the timing of the "on" cycle is relatively consistent.

The location of head-to-disk contact and the location of withdrawal of head-to-disk contact can be substantially the same location on the storage disk, or the location of head-to-disk contact and the location of withdrawal of head-to-disk contact can be different. Accordingly, a consistent portion of the designated track or tracks are used for determining head-to-disk contact, which can provide more accurate results. Moreover, using the synchronous PES method, current directed to the slider mover repeatedly occurs when the read/write head is positioned in substantially the same location relative to a revolution of the storage disk. Stated another way, head-to-disk contact can be repetitiously analyzed over substantially the same disk topography rather than attempting to analyze PES to determine head-to-disk contact at random and changing locations on the storage disk.

In another embodiment of the present invention, changes between head-to-disk contact and non-head-to-disk contact can be detected using a null current method (also referred to as "Null-I"). The approximate moment in time of a change between head-to-disk contact and non-head-to-disk contact can be determined by monitoring the at 'east a portion of the current directed toward the actuator motor 34 (illustrated in FIG. 1) which is based on servo information received by the drive circuitry. This current is the manifestation of the Null-I code in the firmware of the drive circuitry instructing the actuator motor 34 to compensate for off-track movement of the slider. In other words, this current is used to adjust the positioning of the read/write head relative to one or more designated tracks (such as tracks 417D and 417E illustrated in FIG. 4) on the storage disk 416. In this embodiment, when the position error signal has exceeded a predetermined threshold level, the drive circuitry directs current to the actuator motor 34 to compensate for the off-track movement (which is reflected in a PES spike) to drive the PES toward zero and maintain the PES as close to zero as possible.

In this embodiment, monitoring the current directed toward the actuator motor 34 as a result of servo signals such as PES can result in a more steady-state observation over a period of time, i.e. $1/120^{th}$ of a second, $1/240^{th}$ of a second, $1/60^{th}$ of a second, or other multiples or fractions of the fundamental frequency. Stated another way, the current directed toward the actuator motor 34 adjusts the position of the read/write head, and maintains this positioning until a further change in PES occurs, at which point the current is readjusted and again maintained.

Figure 7:
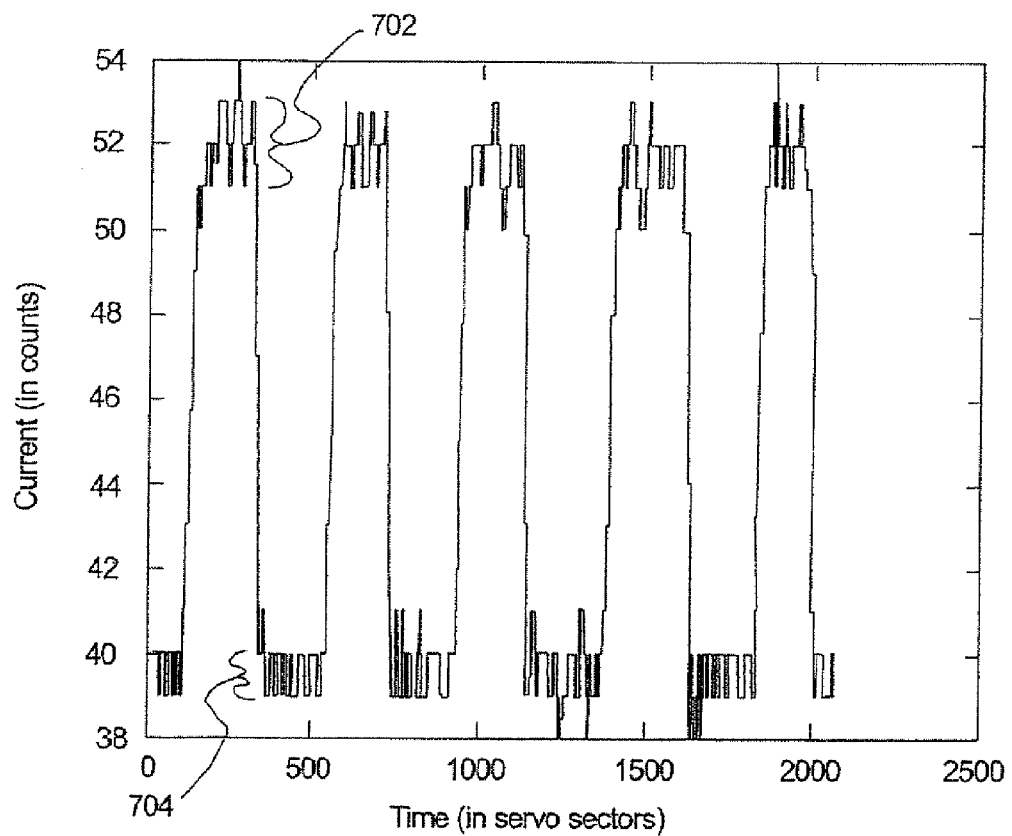
FIG. 7 is a graphical representation of the relationship between current to an actuator motor of the disk drive caused by changes in position error signal as a function of time.

FIG. 7 is a graphical representation of current directed toward the actuator motor 34 (illustrated in FIG. 1) as a result of PES information received by the drive circuitry as a function of time for a given level of power that is alternately turned on and off to the slider mover 200 (illustrated in FIG. 2A). In FIG. 7, time is measured by the number of servo sectors that are read by the read head. In this embodiment, each rotation of the storage disk includes reading approximately 200 servo sectors. Thus, in this example, the power to the slider mover 200 is alternately on for approximately $\frac{1}{120}^{th}$ of a second (approximately 1 revolution of the storage disk) and off for approximately $\frac{1}{120}^{th}$ of a second.

The current directed toward the actuator motor 34 to adjust for changes in PES is at least partially determined by an integrator signal that resides in the firmware of the disk drive. Stated another way, in this embodiment, the current directed toward the actuator motor 34 is basically an integrated output of the PES. Each "count" of the integrator signal corresponds to a predetermined level of current that is directed to the actuator motor 34. For example, in one embodiment, each count of the integrator signal equals approximately 55 microamperes of current, although the level of current per count can vary. The resultant current to the actuator motor 34 is substantially a square wave, representing more of a steady-state level.

Although FIG. 7 illustrates an example where the timing is somewhat similar to the synchronous PES embodiment previously described, it is recognized that such alternating on/off timing is not required for the null current method. Stated in another manner, because the current to the actuator motor is relatively constant following a change in PES over a designated track until another change in PES occurs, the current provides a unique signature for the drive circuitry to determine whether or not a change between head-to-disk contact and non-head-to-disk contact has occurred.

In essence, the current changes between two levels based on a bi-directional change in the PES: a first level 702 that causes a first bias force resulting in rotation of the actuator assembly in a first direction, and a second level 704 that causes a second bias force resulting in rotation of the actuator assembly in a second direction that is opposite the first direction. If the drive circuitry detects that the read/write head has moved off-track in one direction, current is directed to the actuator motor to rotate the actuator assembly in the opposite direction to bring the PES toward zero. It is recognized that the first level 702 and second level 704 can vary depending upon the design of the disk drive, and that the values of current included in FIG. 7 are provided for representative purposes and ease of discussion only.

In one embodiment, if the deviation between the first level 702 and the second level 704 directed to the actuator motor as a result of the changes in PES is at least approximately 10%, a change in the head-to-disk contact status can be assumed to have occurred. In alternative, non-exclusive embodiments, if the deviation between the first level 702 and the second level 704 directed to the actuator motor as a result of the changes in PES is at least approximately 1%, 5%, 20%, 30%, 40%, 50%, 75%, or 100%, a change in the head-to-disk contact status can be assumed to have occurred at a particular confidence of less than or up to 100%.

By determining the timing of the transition between the first level 702 and the second level 704, and factoring in a time constant to initiate the current to the actuator motor caused by the change in PES information, an accurate determination of the approximate moment of transition between head-to-disk contact and non-head-to-disk contact (in either direction) can be ascertained.

Alternatively, the drive circuitry can monitor the current that is directed toward another structure of the head stack assembly that positions the read/write head relative to a track on the storage disk. In one non-exclusive example, current can be directed to a microactuator (not shown) or other type of actuator for adjusting the position of the read/write head relative to the designated track in response to servo information received by the drive circuitry from the slider. The transition between two levels of current can be used to determine a change in the head-to-disk contact status.

In a further embodiment of the present invention, head-to-disk contact can be detected by a readback voltage amplitude method. The readback voltage amplitude provides an indirect measurement of the strength of the magnetic field at the location of the read/write head. The readback voltage amplitude method includes monitoring the readback voltage amplitude while systematically directing current to the slider mover during rotation of the storage disk. It is understood in the art that the strength of the magnetic field of the storage disk increases exponentially as detected by the read/write head as the head-to-disk spacing decreases linearly. This increase in the magnetic field results in a corresponding, proportional exponential increase in the readback voltage amplitude.

In alternative embodiments, the monitoring of readback voltage amplitude can be performed using a variable gain control servo signal (VGAS) or a variable gain control data readback signal (VGAR), either of which can be used at any skew angle.

Figure 8:
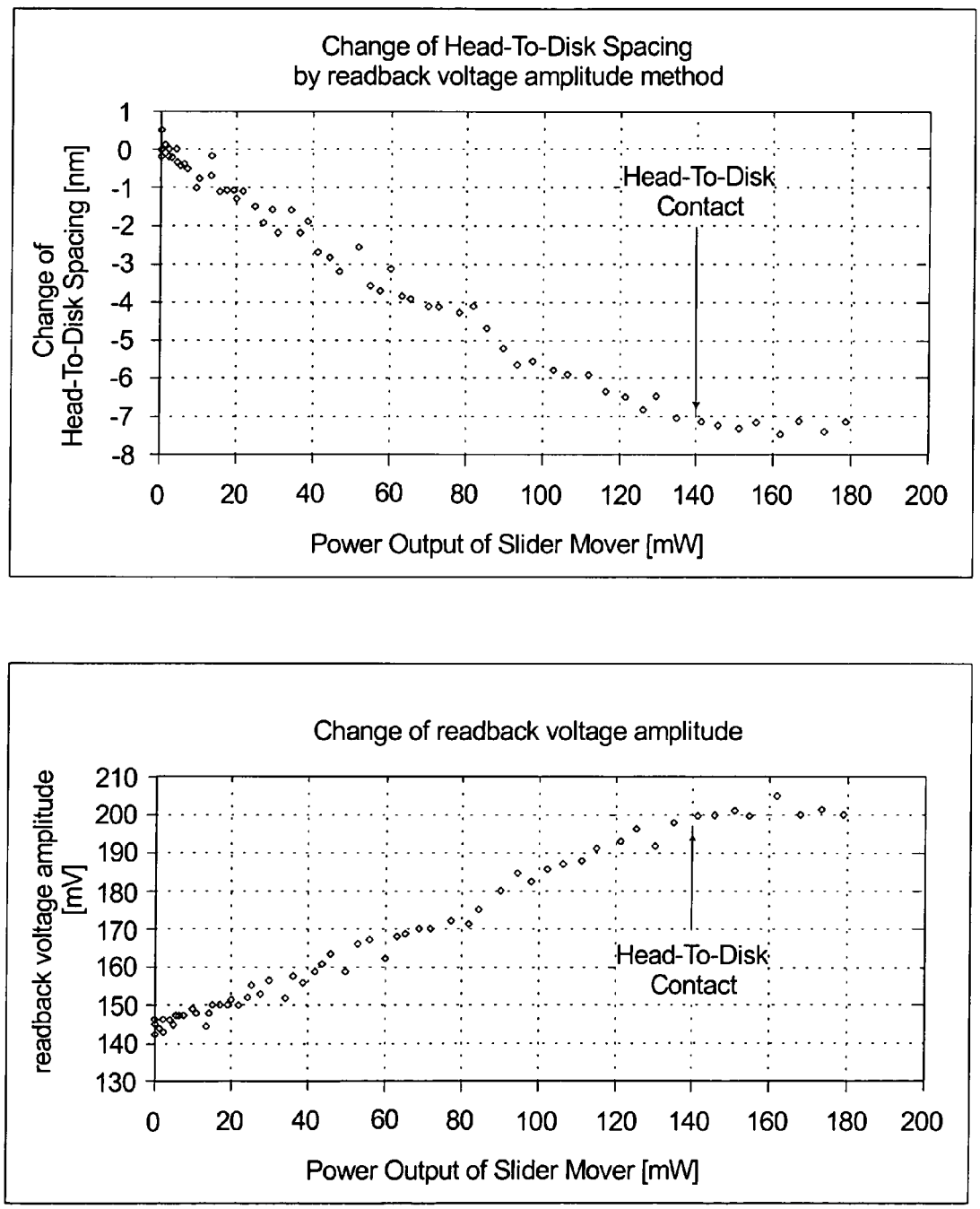
FIG. 8 shows two related graphs of the change in head-to-disk spacing and readback voltage amplitude as a function of power generated by the slider mover.

FIG. 8 includes two related graphs illustrating the relationship between head-to-disk spacing and readback voltage amplitude as a function of power output of the slider mover. An increase in the level of current to the slider mover causes the power output of the slider mover likewise to increase. The increase in power results in a decrease in head-to-disk spacing due to the thermal expansion of the slider (illustrated in the upper graph in FIG. 8. The decrease in head-to-disk spacing causes an increase in the readback voltage amplitude until head-to-disk contact occurs. Once head-to-disk contact occurs, a further increase in the level of current to the slider mover (and thus the power output of the slider mover) does not result in any further substantial change in the head-to-disk spacing. Consequently, at this point, the readback voltage amplitude likewise does not substantially change (illustrated by the level portion in the lower graph in FIG. 8). In other words, once head-to-disk contact occurs, an increase in power output of the slider mover does not translate into any substantial change in readback voltage amplitude.

Therefore, head-to-disk contact can be determined by gradually or incrementally increasing current to the slider mover to increase the power output of the slider mover, and monitoring the readback voltage amplitude. Once the readback voltage amplitude no longer increases with a corresponding increase in current to the slider mover, head-to-disk contact can be determined to have occurred.

In one embodiment, when no substantial change to the readback voltage amplitude is observed following an increase in power to the slider mover of at least approximately 0.1%, head-to-disk contact can be determined to have occurred. In alternative non-exclusive embodiments, when no substantial change to the readback voltage amplitude is observed following an increase in power to the slider mover of at least approximately 0.5%, 1%, 2%, 5%, 10% or 25%, head-to-disk contact can be determined to have occurred.

In still alternative embodiments, once head-to-disk contact occurs, the rate of increase of the readback voltage amplitude decreases from its rate of increase prior to head-to-disk contact. In one embodiment, once head-to-disk contact occurs, the rate of increase of the readback voltage amplitude decreases to approximately zero. Stated another way, once head-to-disk contact occurs, the rate of increase of the readback voltage amplitude decreases by at least approximately 100% from its rate of increase prior to head-to-disk contact. In alternative embodiments, once head-to-disk contact occurs, the rate of increase of the readback voltage amplitude decreases by at least approximately 10%, 25%, 50%, 75%, 90%, 110% or 125% from its rate of increase prior to head-to-disk contact.

In a further embodiment, head-to-disk contact can be detected by a variable frequency oscillator ("VFO") method. The VFO method includes monitoring and/or analyzing a VFO signal that is received by the drive circuitry. The VFO signal is a measurement of changes in velocity of a spindle motor that rotates the storage disk during operation of the disk drive. Thus, the VFO signal effectively monitors changes in the speed of the storage disk. When head-to-disk contact occurs, the friction between the slider and the storage disk in a downtrack direction can result in a decreased velocity of the storage disk. In this embodiment, a certain level of modulation of the VFO signal indicates that the speed of rotation of the storage disk has decreased as a result of head-to-disk contact.

For example, if modulation of the VFO signal indicates that the velocity of the storage disk has decreased below a threshold level, head-to-disk contact can be assumed to have occurred. A greater extent of modulation of the VFO signal can provide a higher confidence level that head-to-disk contact has in fact occurred. The extent of modulation of the VFO signal required for a determination that head-to-disk contact has occurred varies depending upon the design requirements of the disk drive. For example, in one embodiment, the extent of modulation of the VFO signal required for a determination that head-to-disk contact has occurred can be determined by experimental testing.

Figure 9:
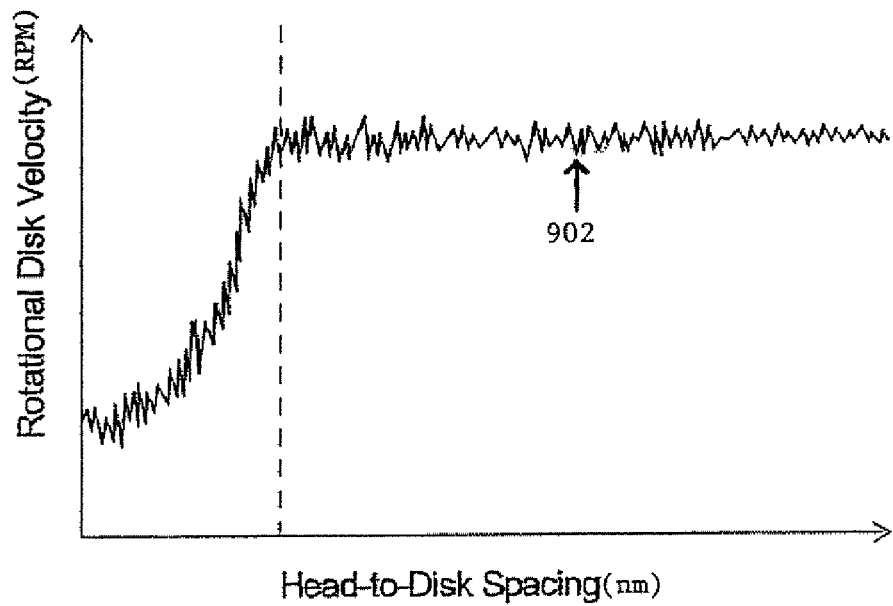
FIG. 9 is graphical representation of the relationship between the rotational speed of a storage disk and a VFO signal as a function of head-to-disk spacing.
Figure 9:
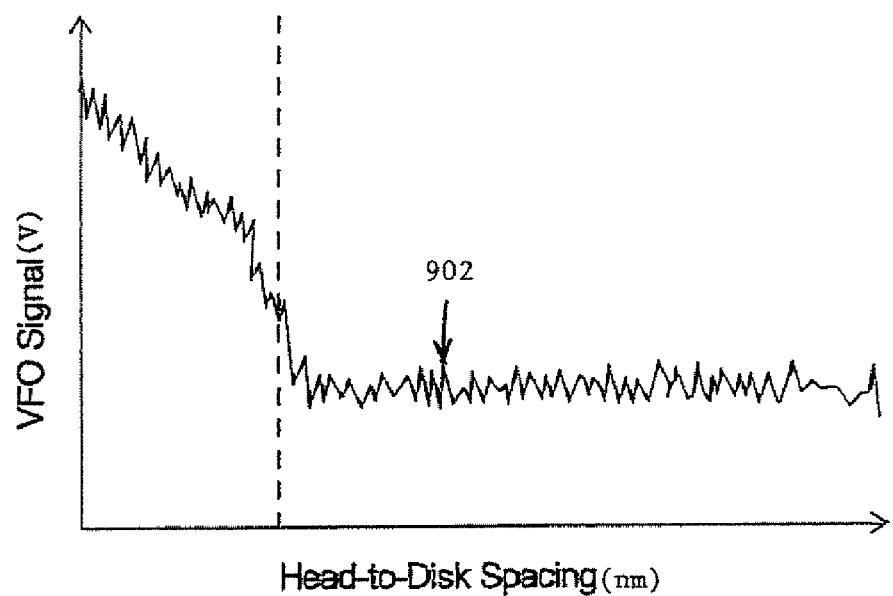

FIG. 9 are two related graphical representations of the relationship between the rotational speed of the storage disk (illustrated by solid line 902 in the upper graph in FIG. 9) and VFO signal (illustrated by solid line 904 in the lower graph in FIG. 9) as a function of head-to-disk spacing. As head-to-disk spacing decreases beyond a particular point, the rotational disk speed 902 decreases, and the VFO signal 904 increases. On the other hand, once the head-to-disk spacing has increased beyond a threshold distance, the rotational disk speed 902 and the VFO signal 904 remain relatively constant.

The timing of when a significant change in the rotational speed of the storage disk 902 and the VFO signal 904 occurs can vary depending upon the design requirements of the firmware of the drive circuitry and the disk drive. In one embodiment, the rotational disk speed 902 decreases and the VFO signal 904 increases at the moment of head-to-disk contact (head-to-disk spacing of approximately 0 nm). In an alternative embodiment, the VFO signal 904 significantly increases when the head-to-disk spacing is negative, e.g. interference between the read/write head and the storage disk that is greater than approximately 0 nm.

In alternative non-exclusive embodiments, head-to-disk contact can be determined once the mean VFO has increased by greater than approximately 1%, 5%, 10%, 25%, 50% or 100% relative to a head-to-disk spacing that is greater than 0 nm, e.g. during non-head-to-disk contact.

In the present invention, when head-to-disk contact occurs, the velocity of the storage disk can decrease by an amount that can be determined from the VFO signal. In this embodiment, an algorithm is programmed into the firmware of the drive circuitry, providing a correlation between the VFO signal, and thus, the velocity of the storage disk, and the extent of the head-to-disk contact. Further, the VFO method can be used at any skew angle.

As repeatedly discussed herein, the occurrence of "head-to-disk contact" following non-head-to-disk contact (such as during track following, for example) can also equally be interchanged with the occurrence of "non-head-to-disk contact" following head-to-disk contact. In other words, although not specifically repeated for every embodiment herein, the methods and percentages described above can be used to detect a change in either direction between head-to-disk contact and non-head-to-disk contact.

Figure 10:
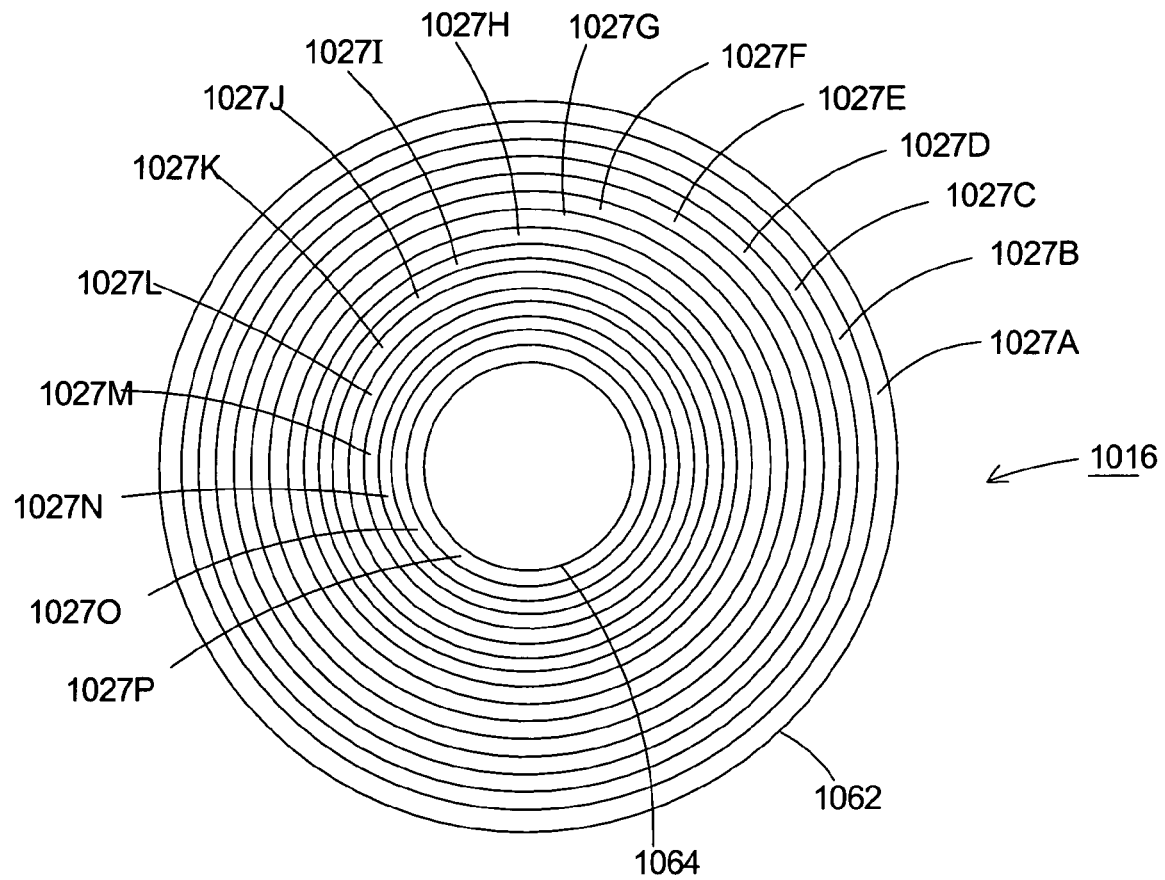
FIG. 10 is a top view of a storage disk illustrating a plurality of disk zones.

FIG. 10 is a top view of a storage disk 1016 illustrating a plurality of disk zones 1027A-P (also referred to simply as "zones") of varying radii. One or more specific zones on the storage disk 1016 can be used for monitoring and detecting head-to-disk contact using the PES variance method and/or the synchronous PES method. For example, in one embodiment, the determination of head-to-disk contact can be performed at three different zones, with each zone including one or more designated tracks. For example, in one embodiment, these tracks are specifically designed for allowing head-to-disk contact, and do not contain data which could otherwise be lost. Alternatively, the designated tracks can be standard data tracks or servo tracks, as non-exclusive examples. In one embodiment, the three zones include an outer zone 1027A located near the outer diameter 1062, an inner zone 1027P located near the inner diameter 1064, and a middle zone 1027E located between the outer zone 1027A and the inner zone 1027P.

The middle zone 1027E can be at zero skew, or it can be at some predetermined non-zero skew angle. In one embodiment, the designated tracks of the middle zone 1027E are positioned outside the skew angle range of ±5 degrees. In this embodiment, the PES can be monitored to determine the likelihood of head-to-disk contact at these three zones 1027A, 1027E, 1027P. Further, PES data from these three zones 1027A, 1027E, 1027P can be interpolated for the other zones of the storage disk 1016 positioned adjacent to or between these zones 1027A, 1027E, 1027P so that the occurrence of head-to-disk contact in these other zones can be determined and eventually used by the drive circuitry to monitor and/or adjust head-to-disk spacing. The interpolation can be substantially linear or it can incorporate some other suitable algorithm or formula. Depending upon the location of the selected zones 1027A-P, extrapolation can be used in addition to interpolation, or in the alternative.

Alternatively, the determination of head-to-disk contact can be performed on designated tracks in greater or fewer than three zones. For example, in another embodiment, head-to-disk contact can be determined in 16 different substantially concentric zones positioned between the inner diameter and the outer diameter of the storage disk 1016.

In yet another embodiment of the present invention, the firmware of the drive circuitry is programmed to use at least two of the methods of determining head-to-disk contact described herein. The drive circuitry can determine that head-to-disk contact has occurred once any one of the methods provides that such head-to-disk contact occurred. Alternatively, the drive circuitry can determine that head-to-disk contact has occurred once two of the methods provide that such head-to-disk contact has occurred. Still alternatively, the drive circuitry can determine that head-todisk contact has occurred once greater than two of the methods provide that such head-to-disk contact has occurred.

Once head-to-disk contact has been detected using any of the methods described herein, for a given skew angle, a readback voltage amplitude can be determined. Further, other readback voltage amplitudes for head-to-disk contact can be determined at other skew angles. Once readback voltage amplitudes for head-to-disk contact have been determined in a plurality of zones on the storage disk, the disk can be "mapped" by interpolation and/or extrapolation, and these readback voltage amplitude zero reference points can be stored for use during monitoring and/or adjusting of head-to-disk spacing.

Moreover, the drive circuitry can determine an approximate threshold level of current to the slider mover (or power output of the slider mover) necessary to cause head-to-disk contact at a given skew angle. This threshold level of current can also be determined for other skew angles so that the storage disk can be mapped according to the approximate threshold level of current necessary to cause head-to-disk contact. As indicated above, interpolation and/or extrapolation can also be used for this purpose.

As indicated previously, the occurrence of head-to-disk contact in the present invention is designed to be substantially non-destructive in nature. In one embodiment, the likelihood of damage can be reduced by providing an early bailout of the slider from contact with the storage disk. As used herein, the term "bailout" refers to a relatively rapid retraction of the slider from contact with the storage disk by any suitable method. In other words, the present invention inhibits damage to the slider and the storage disk despite allowing head-to-disk contact by the methods described above.

Figure 11:
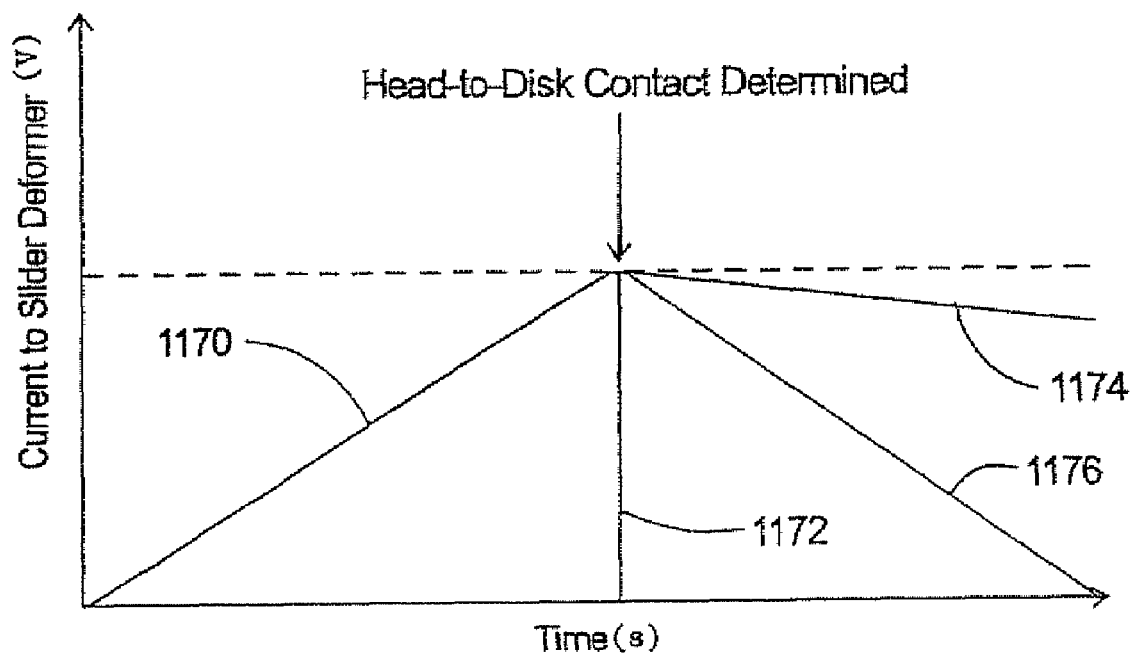
FIG. 11 is a graphical representation of current directed to the slider mover as a function of time, both prior to and following a determination of head-to-disk contact.

FIG. 11 is a graph illustrating three non-exclusive alternative embodiments of how the slider mover can be used to inhibit damage to the slider and/or the storage disk upon the determination of head-to-disk contact. In the embodiments illustrated in FIG. 11, current to the slider mover is gradually increased (illustrated by curve 1170) until one or more of the methods for detecting head-to-disk contact determines that head-to-disk contact has occurred (indicated by arrow in FIG. 11).

The amount of decrease in the level of current to the slider mover to cause bailout can be varied. In one embodiment, once head-to-disk contact is determined, bailout can be accomplished by the drive circuitry completely ceasing current being directed to the slider mover (illustrated by curve 1172). In an alternative embodiment, bailout can be carried out by decreasing (but not completely ceasing) the level of current to the slider mover by a predetermined amount that is sufficient to slightly increase and maintain a relatively small head-to-disk spacing (illustrated by curve 1174). In still an alternative embodiment, bailout can be carried out by gradually decreasing the level of current to the slider mover at a predetermined rate that is sufficient to cause a gradual increase in head-to-disk spacing (illustrated by curve 1176) until either (1) the current is no longer directed to the slider mover, or (2) the current to the slider mover gradually drops to a predetermined level to maintain a particular head-to-disk spacing or range of head-to-disk spacings.

By decreasing the level of current to the slider mover, thermal expansion of the slider is decreased, effectively withdrawing the read/write head from head-to-disk contact, thereby decreasing the likelihood of contact damage such as burnishing of the read/write head, for example. Any other suitable method of withdrawing the slider from contact with the storage disk in a relatively expeditious manner can be utilized to decrease the likelihood of damage to the disk drive and/or potential loss of data.

The given time interval before bailout commences can be varied and/or adjusted as necessary based on the design requirements of the disk drive. In one embodiment, the given time interval can be as short as possible, e.g., as close to instantaneous as the drive circuitry will permit. In another embodiment, the given time interval can be a somewhat longer period of time, which may be necessary for the disk drive to perform other functions. For example, head-to-disk contact may be advantageous for allowing burnishing of the disk surface, or for other suitable purposes such as storage disk mapping or diagnostic testing, as non-exclusive examples.

As provided above, once the non-destructive head-to-disk contact has occurred, a zero clearance reference is established. From this zero clearance reference, current to the slider mover is decreased in a predetermined fashion in order to calibrate and thereby establish the head-to-disk spacing based on the relationship between the change in the strength of the magnetic field and the change in distance between the read/write head and the storage disk.

While the particular slider 24 and disk drive 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A disk drive comprising:
a drive housing;
a storage disk that is rotatably coupled to the drive housing and includes an inner diameter and an outer diameter;
a slider that magnetically interacts with the storage disk and includes a slider mover that receives current to actuate a portion of the slider between a first position wherein the slider does not contact the storage disk and a second position wherein the slider is in contact with the storage disk;
an actuator motor that receives current to position the slider relative to the storage disk to a plurality of positions between the inner diameter and the outer diameter; and
a drive circuitry that directs a varying level of current to the slider mover to actuate the portion, monitors a level of current to the actuator motor and detects approximately when the portion of the slider changes between the first position and the second position as a function of the level of current to the actuator motor.

2. The disk drive of claim 1 wherein the storage disk includes a track having a centerline, and wherein the drive circuitry monitors movement of the slider relative to the centerline to detect approximately when the slider has moved between the first position and the second position.

3. The disk drive of claim 2 wherein the drive circuitry detects movement of the slider from the second position to the first position based on a predetermined amount of movement of the slider away from the centerline.

4. The disk drive of claim 2 wherein the drive circuitry detects movement of the slider from the first position to the second position based on a predetermined amount of movement of the slider away the centerline.

5. The disk drive of claim 1 wherein the drive circuitry monitors an amplitude of a position error signal that is received from the slider to detect approximately when the slider moves between the first position and the second position.

6. The disk drive of claim 5 wherein the drive circuitry monitors changes in the amplitude of the position error signal to detect approximately when the slider moves between the first position and the second position.

7. The disk drive of claim 6 wherein the drive circuitry detects that the slider moves between the first position and the second position when the amplitude of the position error signal changes by more than approximately 10%.

8. The disk drive of claim 6 wherein the drive circuitry detects that the slider moves between the first position and the second position when the amplitude of the position error signal changes by more than approximately 50%.

9. The disk drive of claim 5 wherein the slider is positioned at a nonzero skew angle relative to the storage disk while the position error signal is monitored by the drive circuitry.

10. The disk drive of claim 5 wherein the slider is positioned at a skew angle having an absolute value of greater than 5 degrees relative to the storage disk while the position error signal is monitored by the drive circuitry.

11. The disk drive of claim 5 wherein the drive circuitry detects that the slider moves between the first position and the second position within approximately one-sixth of a second from when the amplitude of the position error signal changes by more than approximately 10%.

12. The disk drive of claim 5 wherein the drive circuitry detects that the slider moves between the first position and the second position within approximately 1/30 of a second from when the amplitude of the position error signal changes by more than approximately 10%.

13. The disk drive of claim 1 wherein the drive circuitry directs current to the slider mover at a first skew angle and at a second skew angle to determine an approximate threshold level of current to the slider mover that causes the slider to move between the first position and the second position at each skew angle.

14. The disk drive of claim 13 wherein the drive circuitry determines the approximately threshold level of current to the slider mover that causes the slider to move between the first position and the second position at skew angles other than the first and second skew angles by at least one of interpolation and extrapolation.

15. The disk drive of claim 1 wherein the slider includes a read/write head that is electrically decoupled from the slider mover.

16. The disk drive of claim 1 wherein the drive circuitry changes the current to the actuator motor based on an amplitude of a position error signal-received by the drive circuitry from the slider.

17. The disk drive of claim 16 wherein the drive circuitry determines that the slider has moved between the first position and the second position based on the change in current to the actuator motor caused by a change in the amplitude in the position error signal.

18. The disk drive of claim 1 wherein the drive circuitry monitors a rotational velocity of the storage disk to detect approximately when the slider moves between the first position and the second position.

19. The disk drive of claim 18 wherein the drive circuitry monitors a variable frequency oscillator signal to determine changes in the rotational speed of the storage disk.

20. A disk drive comprising:
a drive housing;
a storage disk that is rotatably coupled to the drive housing;
a slider that magnetically interacts with the storage disk, the slider including a read/write head;
an actuator motor that moves the slider relative to the storage disk; and
a drive circuitry that changes current to the actuator motor based on an amplitude of a position error signal received by the drive circuitry from the slider and monitors current that is directed to the actuator motor to detect approximately when a change in a head-to-disk contact status occurs based on the current change to the actuator motor.

21. The disk drive of claim 20 wherein the slider includes a slider mover that is spaced-apart from the read/write head, and wherein the drive circuitry directs a varying level of current to the slider mover until the drive circuitry detects that a change in a substantially consistent head-to-disk contact status has occurred.

22. A disk drive comprising:
a drive housing;
a storage disk rotatably coupled to the drive housing;
a slider that magnetically interacts with the storage disk and includes a slider mover that receives current to actuate a portion of the slider between a first position wherein the slider does not contact the storage disk and a second position wherein the slider is in contact with the storage disk; and
a drive circuitry that directs current to the slider mover at a first skew angle and at a second skew angle to determine an approximate threshold level of current to the slider mover that causes the slider to move between the first position and the second position at each skew angle and determine the approximate threshold level of current to the slider mover that causes the slider to move between the first position and the second position at skew angles other than the first and second skew angles by at least one of interpretation and extrapolation.

23. The disk drive of claim 22 wherein the slider includes a read/write head that magnetically interacts with the storage disk.

* * * * *